(12) United States Patent
He et al.

(10) Patent No.: US 11,513,583 B2
(45) Date of Patent: Nov. 29, 2022

(54) METHODS AND SYSTEMS FOR MANAGING MACHINE LEARNING INVOLVING MOBILE DEVICES

(71) Applicant: Verizon Patent and Licensing Inc., Washington, DC (US)

(72) Inventors: Dayong He, Bridgewater, NJ (US); Jyotsna Kachroo, Millburn, NJ (US); Manuel Enrique Caceres, Basking Ridge, NJ (US); Azam Jiva, Bridgewater, NJ (US); Ray P. Hwang, Green Brook, NJ (US); Bruno Mendez, Springfield, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 476 days.

(21) Appl. No.: 16/790,212

(22) Filed: Feb. 13, 2020

(65) Prior Publication Data

US 2020/0183481 A1  Jun. 11, 2020

Related U.S. Application Data

(63) Continuation of application No. 15/707,256, filed on Sep. 18, 2017, now Pat. No. 10,599,205.

(51) Int. Cl.
| | | |
|---|---|---|
| *G06F 9/44* | (2018.01) | |
| *G06F 1/3234* | (2019.01) | |
| *H04W 52/02* | (2009.01) | |
| *G06N 20/00* | (2019.01) | |
| *G06F 1/3212* | (2019.01) | |
| *G06F 1/3206* | (2019.01) | |
| *G06F 9/50* | (2006.01) | |
| *G06F 9/48* | (2006.01) | |
| *G06F 11/34* | (2006.01) | |

(52) U.S. Cl.
CPC .......... *G06F 1/3234* (2013.01); *G06F 1/3206* (2013.01); *G06F 1/3212* (2013.01); *G06N 20/00* (2019.01); *H04W 52/0225* (2013.01); *G06F 9/48* (2013.01); *G06F 9/50* (2013.01); *G06F 11/3409* (2013.01); *H04W 52/0251* (2013.01); *H04W 52/0261* (2013.01)

(58) Field of Classification Search
CPC .................................................. G06F 1/3234
USPC ......................................................... 718/104
See application file for complete search history.

(56) References Cited

U.S. PATENT DOCUMENTS

| | | |
|---|---|---|
| 2009/0163226 A1 | 6/2009 | Karkaria et al. |
| 2010/0221999 A1* | 9/2010 | Braun ............... H04M 1/72412 455/41.1 |
| 2012/0210150 A1 | 8/2012 | De Lind Van Wijngaarden et al. |
| 2013/0262311 A1 | 10/2013 | Buhrmann et al. |

(Continued)

*Primary Examiner* — Timothy A Mudrick

(57) ABSTRACT

A computer device may include a memory configured to store instructions and a processor configured to execute the instructions to determine a device status associated with the wireless communication device and determine that a machine learning process is to be performed based on the determined device status. The processor may be further configured to execute the instructions to select a machine learning model based on the determined device status; select one or more data inputs based on the determined device status; and perform the machine learning process using the selected machine learning model and the selected one or more data inputs.

20 Claims, 14 Drawing Sheets

(56) References Cited

U.S. PATENT DOCUMENTS

2015/0351037 A1\* 12/2015 Brown ................. H01M 10/48
  455/574
2017/0272649 A1\* 9/2017 Liu ....................... H04N 5/247

\* cited by examiner

440/540

| DEVICE PARAMETER 660 | PARAMETER VALUE 662 | VALUE RANGE 664 | SCORE 666 |
|---|---|---|---|
| BATTERY LEVEL | HIGH | > 70% | 2 |
| | MEDIUM | 15% - 70% | 1 |
| | LOW | < 15% | 0 |
| CPU USAGE | HIGH | > 70% | 0 |
| | MEDIUM | 30% - 70% | 1 |
| | LOW | < 30% | 2 |
| GPU USAGE | HIGH | > 70% | 0 |
| | MEDIUM | 30% - 70% | 1 |
| | LOW | < 30% | 2 |
| RAM USAGE | HIGH | > 70% | 0 |
| | MEDIUM | 30% - 70% | 1 |
| | LOW | < 30% | 2 |
| CONNECTION TYPE | NO CONNECTION | BAD | 0 |
| | WIFI OR INTERNET | GOOD - STRONG | 1 |
| | WIFI + INTERNET | GOOD - STRONG | 2 |

| PARAMETER VALUE 672-A | MASKED VALUE 674-N |
|---|---|
| ⋮ | ⋮ |
| PARAMETER VALUE 672-X | MASKED VALUE 674-X |

METHODS AND SYSTEMS FOR MANAGING MACHINE LEARNING INVOLVING MOBILE DEVICES

CROSS REFERENCE TO RELATED APPLICATIONS

This patent application is a continuation of U.S. patent application Ser. No. 15/707,256, filed on Sep. 18, 2017, the contents of which are hereby incorporated by reference in their entirety.

BACKGROUND INFORMATION

In order to satisfy the needs and demands of users of mobile communication devices, providers of wireless communication services continue to improve and expand available services as well as networks used to deliver such services. One aspect of such improvements includes the use of machine learning. Machine learning enables computer devices, such as wireless communication devices, to make decisions or predictions based on user or device data without requiring the user's active participation. For example, a wireless communication device may generate a machine learning model based on a set of training data to perform pattern recognition. However, machine learning processes may require complex computations that drain the resources of a wireless communication device.

BRIEF DESCRIPTION OF THE DRAWINGS

FIG. 6C is a diagram illustrating exemplary components of the device status scoring database of FIG. 4 or FIG. 5;

FIG. 6D is a diagram illustrating exemplary components of the data map database of FIG. 4;

DETAILED DESCRIPTION OF PREFERRED EMBODIMENTS

Figure 1:
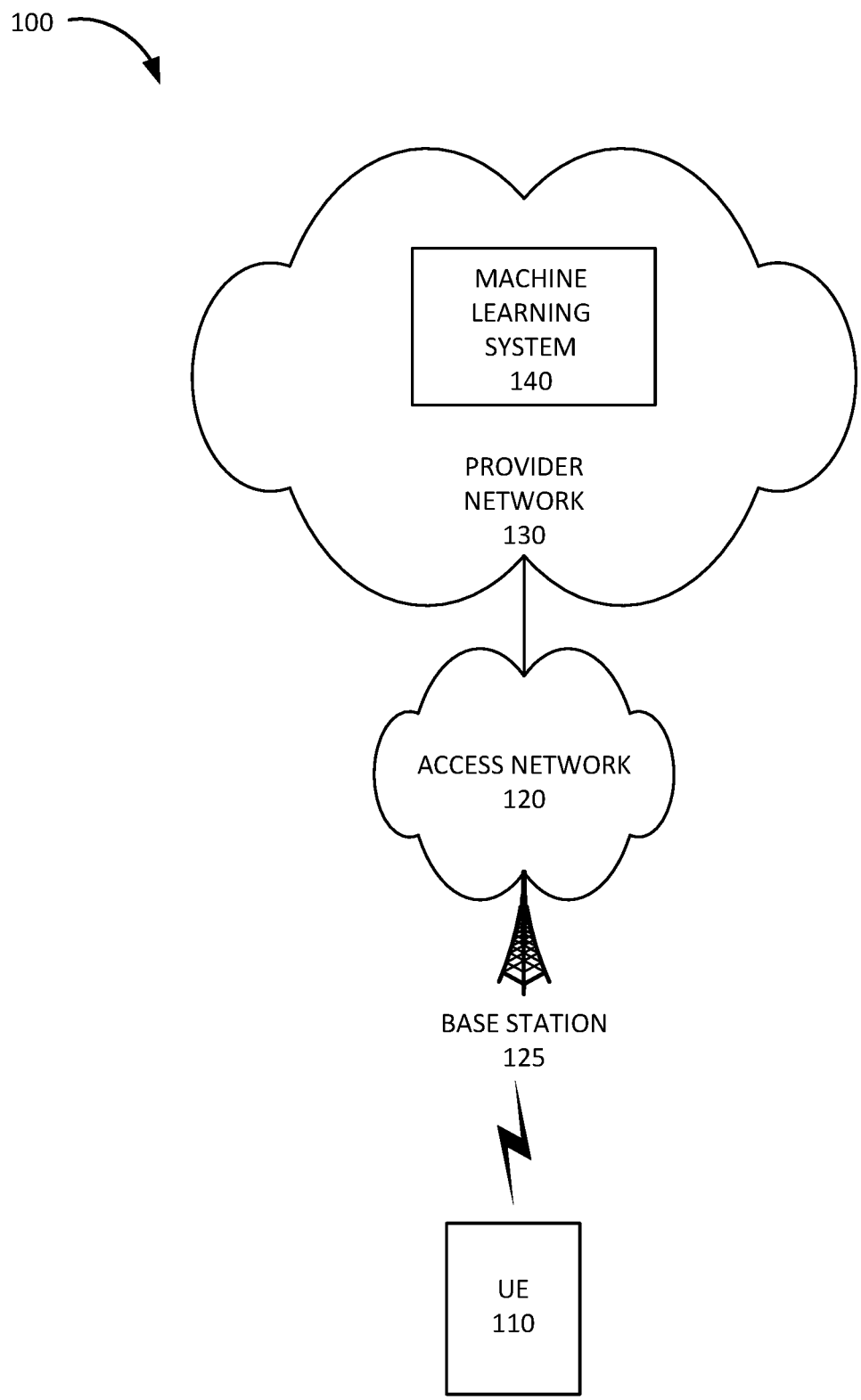
FIG. 1 is a diagram illustrating an environment according to an implementation described herein.

The following detailed description refers to the accompanying drawings. The same reference numbers in different drawings identify the same or similar elements.

Traditionally, machine learning was limited to computers with high computation capabilities and was used in the field of academic research. However, the advancement and innovation in computation power has enabled implementation of machine learning processes on wireless communication devices, such as smart phones and Internet of Things (IoT) devices. However, machine learning computation may consume the resources of a wireless communication device, such as the battery power, processor load and/or time, memory use, and/or network bandwidth.

Thus, if machine learning processes are not properly managed, use of machine learning on a wireless communication device may have serious impacts on device performance or user experience, such as draining the battery, consuming limited memory and processing resources, and/or making the device unresponsive when the device is in a state of high processor use. Furthermore, since machine learning may use native libraries to perform computations, when machine learning is embedded on a wireless communication device, the native libraries may need to be built into applications and deployed to the wireless communication device.

Furthermore, because a wireless communication device may include multiple applications, the wireless communication device may include multiple machine learning capabilities/services. As more machine learning capabilities are added to the device, the total storage space taken up by the native libraries may increase at a large pace, using up the storage capacity of the device. Moreover, coordinating bug fixes or performing updates on the native libraries may be complicated if each machine learning service manages its own native libraries.

Implementations described herein relate to a machine learning stack to manage machine learning on a wireless communication device. The machine learning stack may include a software development kit (SDK) that includes one or more Application Programming Interfaces (APIs) that may be used by applications on the wireless communication device to interact with a smart engine. The smart engine may respond to requests from applications for a machine learning service. The smart engine may determine a device status associated with the wireless communication device, may obtain device data associated with the wireless communication device, and may determine whether to run the requested machine learning process based on the obtained device status and/or device data.

If the smart engine selects to perform the machine learning process, the smart engine may schedule to run the machine learning process at a particular time, such as when the device status is in a particular state (e.g., idle state, processor load below a particular value, etc.). Furthermore, the smart engine may select a machine learning model based on the determined device status, select one or more data inputs based on the determined device status, and perform the machine learning process using the selected machine learning model and the selected one or more data inputs.

The device status may indicate a current resource capacity of the wireless communication device, measured by parameters including, for example, the battery power level, a measure of a processor load, a measure of memory use, a measure of a network connection quality, and/or other types of measures of the resource capacity of the wireless communication device. Different machine learning models may be associated with different expected resource use. For example, a first machine learning model may use less battery power, processor time, memory, and/or network bandwidth, etc., and a second machine learning model may use more battery power, processor time, memory, and/or network bandwidth, etc. The smart engine may select a machine learning model based on the determined device status to match an expected resource use of the selected machine learning model with the current resource capacity of the wireless communication device. Matching the expected resource use of a selected machine learning model with a current resource capacity of the wireless communication device improves the functioning of the wireless communication device by conserving resources when resource capacity is low and by using more accurate machine learning models when resource capacity is high.

In the machine learning stack, machine learning services may be modularized, with particular machine learning modules having defined functionalities, and working independently or together to complete a particular machine learning task. Different machine learning modules may use different algorithms and/or different parameters for the algorithms to make decisions, predictions, and/or inferences. The smart engine may make adjustments to data sources and/or machine learning models/classifiers/algorithms used by a particular machine learning module based on the determined device status.

The machine learning stack may include a machine learning framework that hosts numerical libraries and implementations of particular machine learning algorithms. When machine learning modules with particular functionalities are built with libraries in the machine learning framework, the storage space taken up by the machine learning stack on the wireless communication device may be reduced. Furthermore, bug fixes and/or updates to the numerical libraries and/or machine learning algorithm implementations may be performed in a more efficient manner.

Implementations described herein further relate to using machine learning for behavioral authentication. In behavioral authentication, the user's behavior data, such as how the user touches a touchscreen of a wireless communication device, how the user carries or holds the device, the user's location, cell tower identifiers (IDs), WiFi Access Point (AP) IDs, IDs of Bluetooth (and/or other short range wireless) devices connected to the wireless communication device, and/or other types of user information, may be used by machine learning to build a user profile and to recognize and authenticate the user. The data collected about the user may correspond to a set of numbers that does not include the user's privacy or personal information.

In order to address users' concerns about user privacy or personal data being collected for behavioral authentication, the user may be provided with one or more options to select how the collected data is used. When the user data is collected, it may not be necessary to use the actual values in classification algorithms used by machine learning processes. Thus, the collected user data may be mapped to masked values (e.g., integers) assigned to particular values of particular parameters. After the mapping is performed, the masked values may be provided as input to a classification algorithm used by the machine learning processes. Thus, the user data may be stored in secure storage on the wireless communication device and the masked data may be used in machine learning calculations, performed either by the wireless communication device or by a machine learning system (e.g., a machine learning server device). Even if the data sent to the machine learning system is compromised, the data may not be interpretable without access to the mapping stored on the wireless communication device.

The user may further be provided with an option to run behavioral authentication locally on the wireless communication device only, remotely using the machine learning system, or both using a hybrid approach. When the user selects to run machine learning for behavioral authentication on the wireless communication device, the user data may not be sent to the machine learning system and the behavioral authentication decision may rely solely on the machine learning results computed on the wireless communication device. When the user selects to run machine learning for behavioral authentication on the machine learning system, masked user data may be sent to the machine learning system and the machine learning system may generate the behavioral authentication decision and send the decision back to the wireless communication device. Moreover, if a particular machine learning module is improved based on the user's data, the improved model may be downloaded and installed on the wireless communication device.

In a hybrid approach, machine learning models and algorithms may be deployed both on the wireless communication device and on the machine learning system. The wireless communication device may perform the machine learning process and may consult with the machine learning system for a recommendation and/or may use the machine learning system to perform cloud computing for the machine learning computations. Alternatively, another device associated with the user that has additional computing resources, such as the user's home computer, laptop computer, and/or a tablet computer may be configured to perform the machine learning computations on behalf of the wireless communication device. Training of a machine learning model may be performed on the wireless communication device or on another device.

Furthermore, the user may be provided with an option to manage the machine learning data. For example, the user may be provided with an option to remove any data associated with the user from the machine learning system and/or from the wireless communication device. Moreover, behavioral authentication may be provided to the user as a service on demand and the user may be provided with an option to subscribe to the service or to un-subscribe from the service. When the user subscribes to the service and selects to send data to the machine learning system, the machine learning system may generate a profile for the user. If the user later un-subscribes, the user may be provided with an option to erase the user's data stored on the machine learning system. While the user is subscribed, the user may be provided with an option to turn the machine learning service for behavioral authentication on or off. If the user selects to turn off the behavioral authentication, the user data may remain on the machine learning system while the user's subscription is active.

A "machine learning process," as the phrase is used herein, may refer to a process performed without requiring user interaction using a trained classifier to determine a decision, prediction, and/or inference for a particular application or process running on a wireless communication device and/or a machine learning system. Furthermore, a machine learning process may refer to a process of training the classifier using supervised (e.g., a labeled data set) or unsupervised learning (e.g., an unlabeled data set), using a trained classifier to arrive at a decision, prediction, and/or inference using a particular data set, and/or updating or refining a trained classifier using a particular data set.

FIG. 1 is a diagram of an exemplary environment 100 in which the systems and/or methods, described herein, may be implemented. As shown in FIG. 1, environment 100 may include a UE device 110, an access network 120, and a provider network 130.

UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; and/or any other type of computer device with wireless communication capabilities and a user interface. UE device 110 may be used for voice communication, mobile broadband services (e.g., video streaming, real-time gaming, high speed Internet access etc.), best effort data traffic, and/or other types of applications.

In other implementations, UE device 110 may include an IoT computer device enabled with wireless communication functionality and employing machine-to-machine (M2M) communication. In some implementations, the M2M communication may include Machine-Type Communication (MTC), a type of M2M communication standard developed by the 3$^{rd}$ Generation Partnership Project (3GPP). In other implementations, the M2M communication may include a different type of communication not tied to a particular 3GPP standard. For example, UE device 110 may include an embedded wireless MTC device that communicates wirelessly with other devices over a machine-to-machine (M2M) interface, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device. An MTC device may correspond to a stationary low data rate MTC device (e.g., parking meter), a stationary high data rate MTC device (e.g., a camera providing a video feed), an MTC device moving at pedestrian speeds (e.g., a health monitoring device attached to a user), and MTC device moving at vehicular speed (e.g., a vehicle telematics device), and/or another type of MTC device.

In other implementations, UE device 110 may correspond to an unmanned aerial vehicle or an unmanned aircraft system that communicates wirelessly with other devices over an M2M interface using MTC and/or another type of M2M communication. Examples of such airborne MTC devices include consumer drone devices used for entertainment, photo or video capture, payload delivery, and/or other uses; commercial delivery drones used to deliver packages to customers; law enforcement drones used for intelligence gathering operations; and/or other types of drones or aerial devices.

Access network 120 may provide access to provider network 130 for wireless devices, such as UE device 110. Access network 120 may enable UE device 110 to connect to provider network 130 for mobile telephone service, Short Message Service (SMS) message service, Multimedia Message Service (MMS) message service, Internet access, access to a private network, cloud computing, and/or other types of data services.

Access network 120 may establish a packet data network connection between UE device 110 and provider network 130. In some implementations, access network 120 may include a Long Term Evolution (LTE) access network (e.g., an evolved packet core (EPC) network) based on the LTE standard specified by the 3$^{rd}$ Generation Partnership Project (3GPP). In other implementations, access network 120 may include a Code Division Multiple Access (CDMA) access network based on, for example, a CDMA2000 standard. For example, the CDMA access network may include a CDMA enhanced High Rate Packet Data (eHRPD) network (which may provide access to an LTE access network).

In other implementations, access network 120 may include an LTE Advanced (LTE-A) access network and/or any other advanced network, such as a 5G access network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Access network 120 may include a base station 125 and UE device 110 may wirelessly communicate with access network 120 via base station 125 when UE device 110 is located within the geographic area serviced by base station 125. Base station 125 may be part of an LTE eNodeB base station device. An eNodeB base station device may use the Evolved Universal Terrestrial Radio Access (E-UTRA) air interface to wirelessly communicate with devices. An eNodeB base station device may include one or more devices (e.g., base stations 125) and other components and functionality that allow UE device 110 to wirelessly connect to access network 120. The eNodeB base station device may include or be associated with one or more cells. For example, each cell may include a radio frequency (RF) transceiver facing a particular direction. The eNodeB base station device may correspond to a macrocell or to a small cell (e.g., a femtocell, a picocell, a microcell, etc.).

Provider network 130 may include a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, the Internet, or a combination of networks. Provider network 130 may allow the delivery of Internet Protocol (IP) services to UE device 110, and may interface with other external networks. Provider network 130 may include one or more server devices and/or network devices, or other types of computation or communication devices. In some implementations, provider network 130 may include an Internet Protocol Multimedia Sub-system (IMS) network (not shown in FIG. 1). An IMS network may include a network for delivering IP multimedia services as specified by 3GPP and may provide media flows between UE device 110 and external IP networks or external circuit-switched networks (not shown in FIG. 1).

Provider network 130 may include a machine learning system 140. In other implementations, machine learning system 140 may be located outside of provider network 130. For example, machine learning system 140 may be located inside a private network (not shown in FIG. 1) that is connected to provider network 130. Machine learning system 140 may include one or more devices, such as computer devices and/or server devices, which are configured to communicate with UE device 110 to perform machine learning. For example, machine learning system 140 may include one or more machine learning models, numerical libraries, and/or cloud computing resources for performing a machine learning process on behalf of UE device 110. Machine learning system 140 may receive data from UE device 110, may train a particular machine learning model based on the received data, and may perform future decisions and/or predictions based on the learned machine learning model. In some implementations, machine learning system 140 may select a particular machine learning model and/or particular data sources based on a particular machine learning application. Furthermore, in some implementations, machine learning system 140 may provide cloud computing resources for machine learning models running on UE device 110.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
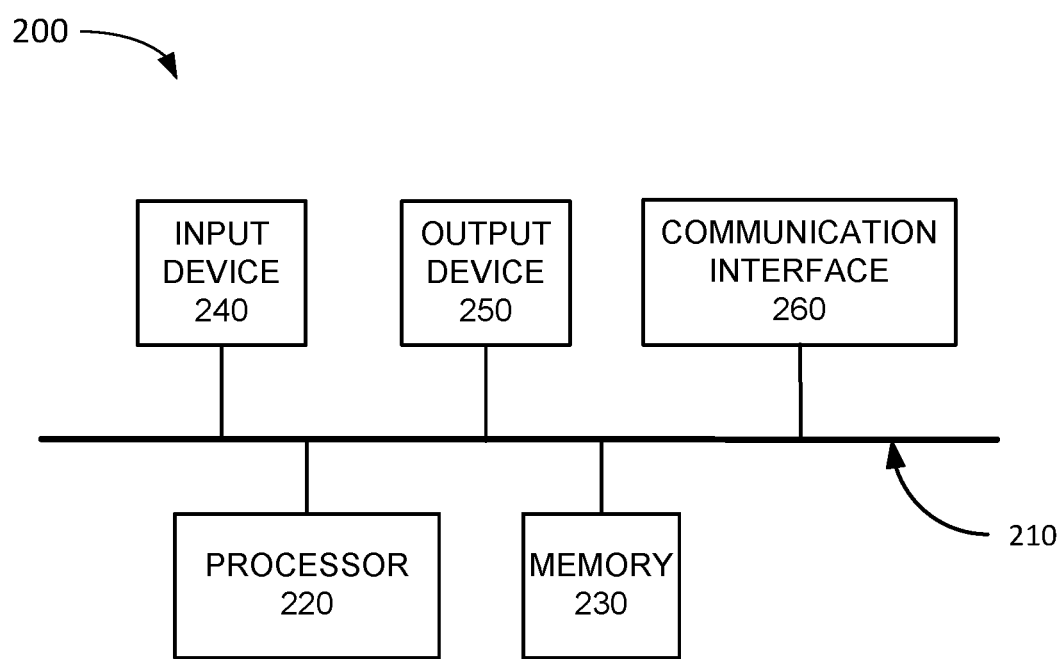
FIG. 2 is a diagram illustrating exemplary components of a device that may be included in a device of FIG. 1.

FIG. 2 is a diagram illustrating example components of a device 200 according to an implementation described herein. UE device 110 and machine learning system 140 may each include one or more devices 200 or components of device 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. For example, processor 220 may include one or more Central Processing Units (CPUs) and/or one or more Graphics Processing Units (GPU). In other embodiments, processor 220 may include an application-specific integrated circuit (ASIC), a field-programmable gate array (FPGA), and/or another type of integrated circuit or processing logic. Processor 220 may control operation of device 200 and its components.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200 and/or to collect information from the environment using one or more sensors. Input device 240 may include, for example, buttons (e.g., a keyboard, keys of a keypad, control buttons, etc.), a mouse, a pen, a joystick, a tracking pad, a stylus, a remote control, a microphone or another audio capture device, an image and/or video capture device (e.g., a camera), a touch-screen display, a light sensor, a gyroscope, an accelerometer, a proximity sensor, a temperature sensor, a barometer, a compass, a health sensor (e.g., pulse rate monitor, etc.), and/or another type of input device. In some implementations, device 200 may be managed remotely and may not include input device 240. In other words, device 200 may be "headless" and may not include a keyboard, for example.

Output device 250 may output information to an operator of device 200 and/or to control device 200 and/or the environment using one or more actuators. Output device 250 may include a display, a printer, a speaker, an illumination source (e.g., a camera flash), an actuator to cause device 200 to vibrate, a motor to cause part of device 110 to move, a lock device, and/or another type of output device. For example, device 200 may include a display, which may include a liquid-crystal display (LCD), a light emitting diode (LED) display, an organic LED (OLED) display, an electrophoretic (e.g., electronic ink) display, and/or another type of display device for displaying content to the customer. In some implementations, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to an antenna for transmitting and receiving RF signals. For example, if device 200 is included in UE device 110, communication interface 260 may include an antenna assembly that includes one or more antennas to transmit and/or receive RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface or an interface for another type of short range (e.g., less than 100 meters) wireless communication method, a radio-frequency identification (RFID) interface, a near-field communications (NFC) wireless interface, a Global Positioning System (GPS) receiver to obtain location information from GPS satellites, an optical transceiver, and/or any other type of interface that converts data from one form to another form.

As will be described in detail below, device 200 may perform certain operations relating to performing and/or using machine learning. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
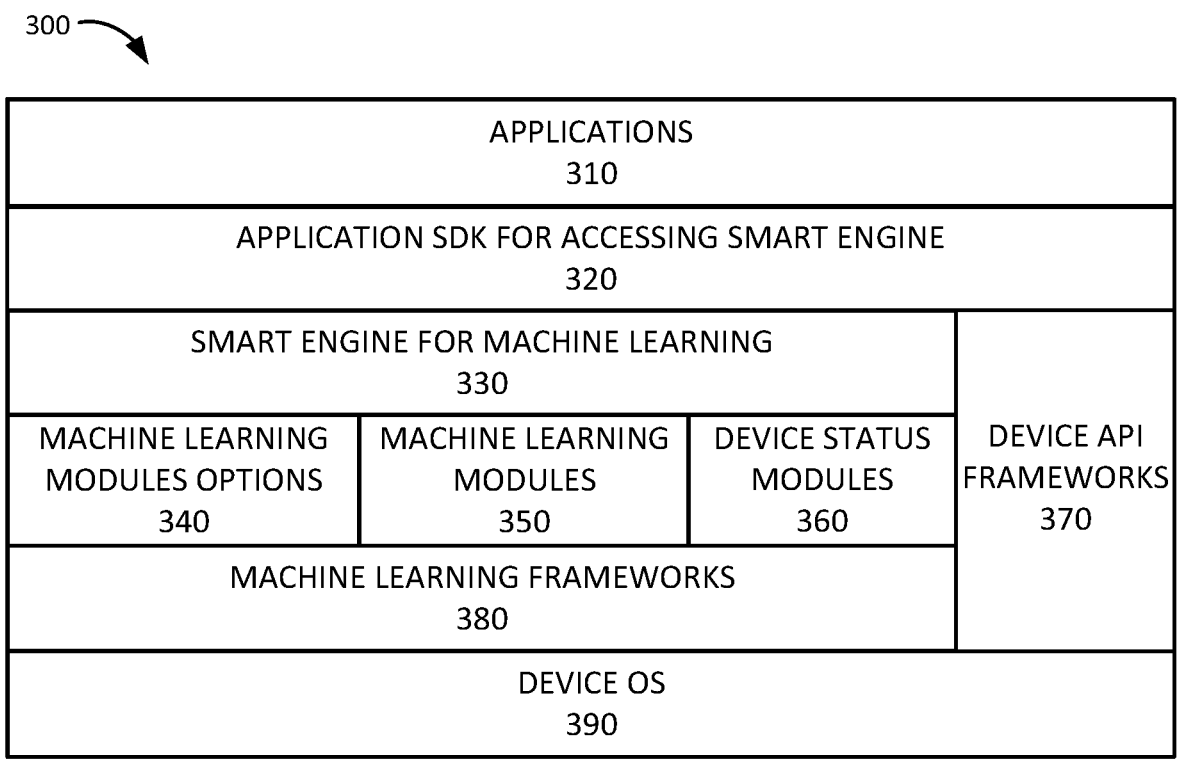
FIG. 3 is a diagram illustrating an exemplary machine learning stack according to an implementation described herein.

FIG. 3 is a diagram illustrating an exemplary machine learning stack 300 according to an implementation described herein. As shown in FIG. 3, machine learning stack 300 may include applications 310, an application software development kit (SDK) 320, a smart engine 330, machine learning modules options 340, machine learning modules 350, device status modules 360, device application programming interface (API) frameworks 370, machine learning frameworks 380, and a device operating system (OS) 390.

Applications 310 may include applications running on UE device 110 that may make use of machine learning. For example, applications 310 may include a behavioral authentication application, an image processing application that performs pattern recognition, a gaming application, a speech recognition application, a natural language processing application, a health monitoring application, a text auto-correct/auto-complete application, a sentiment analysis application, an application that optimizes user settings and/or preferences on UE device 110, a financial analysis application, a targeted advertising application, and/or another type of application that may utilize machine learning.

Application SDK 320 may include a set of tools that enable applications 310 to access machine learning available on UE device 110 by communicating with smart engine 330. For example, application SDK 320 may include one or more Application Programming Interfaces (APIs) to interface with smart engine 330.

Smart engine 330 may control the operation of machine learning processes on UE device 110. Smart engine 330 may obtain the device status of UE device 110, such as, for example, the device mode (e.g., active, sleep, idle, nap, deep sleep, etc.), the battery level, the CPU/GPU processor load, memory usage, quality of a network connection, applications currently running on UE device 110, machine learning processes scheduled to run, and/or other types of device status information. Smart engine 330 may determine, based on the obtained device status information, whether to run machine learning services, when to run machine learning services (e.g., by scheduling and/or prioritizing machine learning services), what type of data sources to use for different device status conditions (e.g., dominant factors, non-dominant factors, resource-intense factors, non-resource-intense factors, etc.), how frequently to pull data from particular data sources, which machine learning models/classifiers, algorithms to use for different device status conditions, and/or whether to communicate with machine learning system 140 to perform a machine learning process, to confirm a result of a machine learning process, and/or to use machine learning system 140 for cloud computing to perform machine learning calculations.

Thus, smart engine 330 together with device status modules 360 and machine learning modules options 340 in machine learning stack 300 may be used to manage machine learning services embedded on UE device 110 and my reduce the impact of performing machine learning computations on the performance of UE device 110 and/or on user experience. Machine learning stack 300 may be used to improve memory and/or storage use of UE device 110, to fix software bugs, and/or to perform updates based on a device status associated with UE device 110.

Machine learning modules options 340 may provide information relating to options available for machine learning modules 350. For example, machine learning modules options 340 may include information relating to algorithms and models available for a particular machine learning module 350 (e.g., a Support Vector Distribution Estimation (SVDE) model, etc.) and/or data sources needed by a particular machine learning module 350 (e.g., a velocity and magnitude of a touch event used for behavioral authentication).

Furthermore, machine learning modules options 340 may include information identifying dominant (e.g., major) and/or non-dominant (e.g., minor) factors for a particular machine learning module 350. A dominant factor corresponds to a data input to a model that has a high contribution weight to a final score for a decision, prediction, and/or inference, and a non-dominant factor corresponds to a data input to a model that has a low contribution weight to a final score for a decision, prediction, and/or inference. For example, for machine learning modules 350 configured to perform behavioral authentication, pressure and velocity of a touch event on a touchscreen may correspond to a dominant factor and a gait pattern measured by an accelerometer may correspond to a non-dominant factor.

Moreover, machine learning modules options 340 may include information identifying resource-intense and non-resource-intense factors for a particular machine learning module 350. A resource-intense factor corresponds to a data source for a model that consumes a large number of resources, such as battery power, processor load, and/or memory use, and a non-resource-intense factor corresponds to a data source that does not consume a large number of resources. For example, collecting accelerometer data for gait analysis may consume more battery power (e.g., resource-intense) than collecting input from a touchscreen (e.g., non-resource-intense).

Machine learning modules 350 may include machine learning modules for particular applications. For example, a first machine learning module may be trained to perform behavior classification, a second machine learning module may be trained to perform object recognition in images, a third machine learning module may be configured to perform auto-completion/auto-correction for a messaging application, etc. Additionally or alternatively, different machine learning modules may use different classifier models and/or different data sources. Furthermore, different classifier models may be trained for different accuracies, types and/or numbers of data sources, and/or a frequency at which data is obtained. For example, a first behavioral authentication machine learning module may be trained for high accuracy and a larger number of data sources, and may use more resources, and a second behavioral authentication machine learning module may be trained for lower accuracy and fewer data sources, and may use fewer resources. Smart engine 330 may select a particular machine learning module 350 based on the status of UE device 110.

A particular machine learning module 350 may be associated with a record that describes the functionalities of the machine learning module, the data sources used by the machine learning module, the classifiers (e.g., models and algorithms) used by the machine learning module, and/or the dominant factors, non-dominant factors, resource-intense factors, and/or non-resource-intense factors associated with the machine learning module 350. The record may be included in machine learning modules options 340.

Device status modules 360 may obtain the status of UE device 110, such as device mode, battery level, processor load, memory usage, network connection quality, application running on UE device, an application requesting machine learning services, and/or other types of device status information.

Device API frameworks 370 may include one or more APIs for obtaining device status information and/or for obtaining data from data sources, such as sensors included on UE device 110 and/or information available via communication interface 260, such as an identifier (ID) for base station 125, IDs for WiFi access points (APs) near UE device 110, and/or IDs for Bluetooth devices connected to UE device 110. Device API framework 370 may also include APIs used by other components of the machine learning stack 300, such as application SDK 320 and smart engine 330.

Machine learning frameworks 380 may include libraries for numerical calculations, particular machine learning models, classifiers, and/or algorithms, and/or other computation tools used by machine learning modules 350. The libraries and/or models may be optimized for running on UE device 110 (e.g., based on a particular CPU/GPU architecture). The use of low level libraries may reduce problems caused by bug fixes and/or updates, as such fixes or updates may be performed on the low level libraries without affecting the functionalities of higher levels of machine learning stack 300, such as machine learning modules 350. Furthermore, the use of the low level libraries may reduce the storage requirements of machine learning stack 300 on UE device 110. Device OS 390 may correspond to an underlying OS running on UE device 110, such as, for example, Android, Android Things, iOS, Windows Phone, Raspbian, Ubuntu, RIOT, and/or another type of OS.

Although FIG. 3 shows exemplary components of machine learning stack 300, in other implementations, machine learning stack 300 may include fewer components, different components, additional components, or differently arranged components than depicted in FIG. 3. Additionally or alternatively, one or more components of machine learning stack 300 may perform one or more tasks described as being performed by one or more other components of machine learning stack 300.

Figure 4:
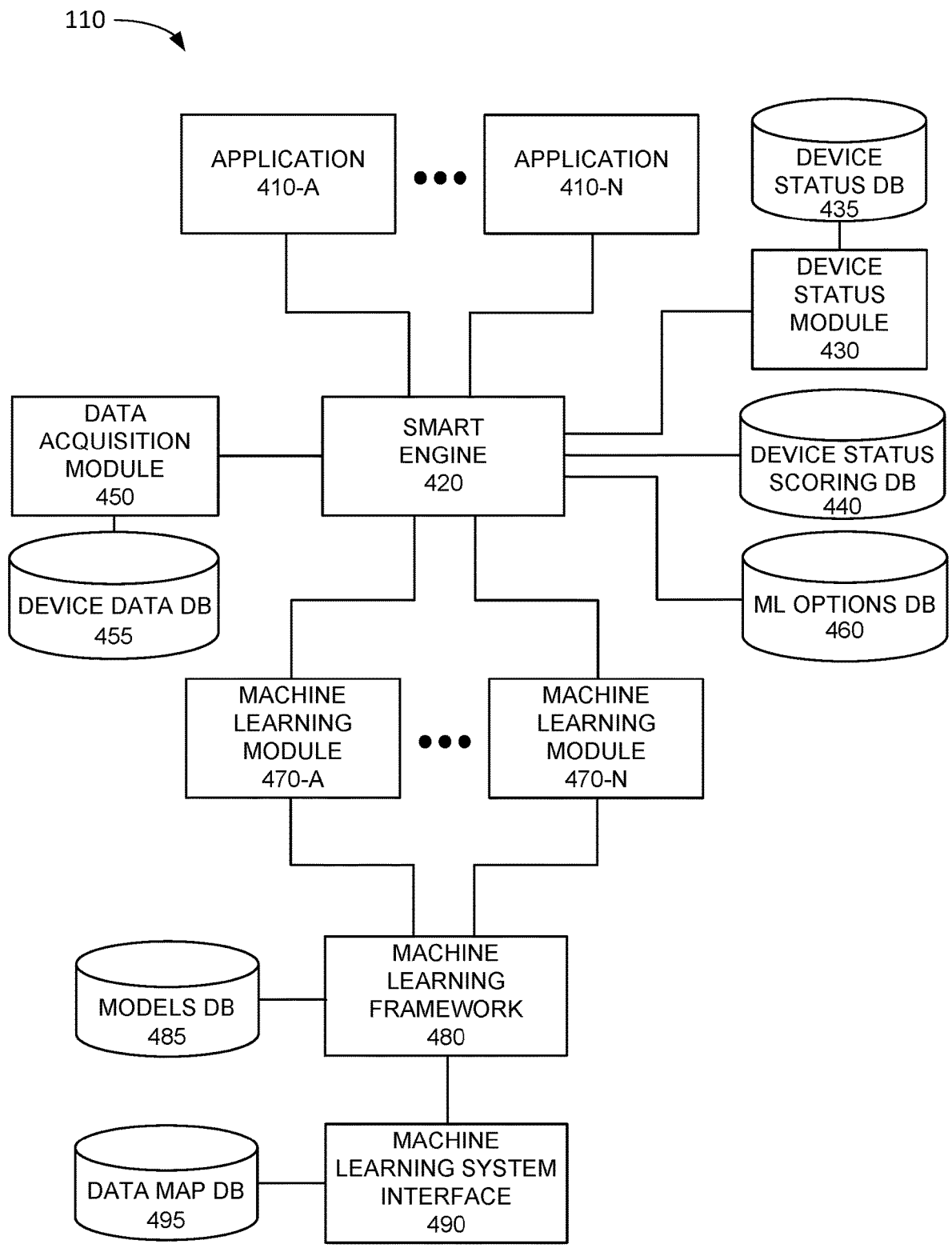
FIG. 4 is a diagram illustrating exemplary functional components of the user equipment device of FIG. 1.

FIG. 4 is a diagram illustrating exemplary functional components of UE device 110. The functional components of UE device 110 shown in FIG. 4 may correspond to an exemplary implementation of machine learning stack 300. The functional components of UE device 110 may be implemented, for example, via processing unit 220 executing instructions from memory 230 (e.g., stored in a database and/or cached in memory for faster access). Alternatively, some or all of the functional components included in UE device 110 may be implemented via hard-wired circuitry. As shown in FIG. 4, UE device 110 may include one or more applications 410-A to 410-N, a smart engine 420, a device status module 430, a device status database (DB) 435, a device status scoring DB 440, a data acquisition module 450, a device data DB 455, a machine learning (ML) options DB 460, one or more machine learning modules 470-A to 470-N, a machine learning framework 480, a models DB 485, a machine learning system interface 490, and a data map DB 495.

Application 410 may correspond to applications 310 as described above with respect to FIG. 3. Smart engine 420 may correspond to smart engine 330 as described above with respect to FIG. 3. Device status module 430 may correspond to device status modules 360 of machine learning stack 300. Device status module 430 may obtain device status information for UE device 110 and store the obtained device status information in device status DB 435. The device status information may be indicative of a current and/or past resource capacity of UE device 110. Exemplary information that may be stored in device status DB 435 is described below with reference to FIG. 6A. Smart engine 420 may determine scores for the obtained device status information stored in device status DB 435 using scoring information stored in device status scoring DB 440. Exemplary information that may be stored in device status scoring DB 440 is described below with reference to FIG. 6C.

Data acquisition module 450 may obtain device data from sensors associated with UE device 110 and/or from communication interface 260 and may store the obtained device data in device data DB 455. Exemplary information that may be stored in device data DB 455 is described below with reference to FIG. 6B. Smart engine 420 may receive a request from a particular application 410 for a machine learning service, and may use the information stored in device status DB 435, device status scoring DB 440, and/or device data DB 455 to determine whether to perform the machine learning service. In some implementations, in order to obtain accurate values for the device status, smart engine 420 may call on device status module 430 directly rather than obtaining device status information from device status DB 435. When device status module 430 receive a request from smart engine 420 for device status information, device status module 430 may obtain the device status data and provide the device status data to smart engine 420. Similarly, smart engine 420 may obtain device data directly from data acquisition module 450.

If smart engine 420 selects to perform the machine learning service, smart engine 420 may use the information stored in device status DB 435, device status scoring DB 440, and/or device data DB 455 to select a particular machine learning module 470 to perform the machine learning service. Furthermore, smart engine 420 may access ML options DB 460 to select the particular machine learning module 470 and/or to select options for the particular machine learning module 470. Exemplary information that may be stored in ML options DB 460 is described below with reference to FIG. 6E.

Machine learning modules 470 may correspond to machine learning modules 350 of machine learning stack 300. Each machine learning module 470 may be configured to perform a particular machine learning service. As an example, in some implementations, each application 410 may be associated with a particular machine learning module 470. As another example, each machine learning module 470 may use a particular machine model/classifier/algorithm, such as a K-nearest neighbor classifier, a naïve Bayesian classifier, a logical regression classifier, a neural network classifier, a support vector machine (SVM) classifier, a decision tree classifier, a maximum entropy classifier, a kernel density estimation classifier, and/or another type of classifier.

Furthermore, different machine learning modules 470 may be associated with different accuracies and/or resource requirements. For example, a first machine learning module 470 may be associated with a neural network classifier with a smaller number of nodes, a lower accuracy, and a lower resource use requirement, and a second machine learning module 470 may be associated with a neural network classifier with a larger number of nodes, a higher accuracy, and a higher resource use requirement. Smart engine 420 may select the first machine learning module 470 when the device status indicates a low battery power and/or high resource load for UE device 110 and may select the second machine learning module 470 when the device status indicates a high battery power and/or low resource load for UE device 110.

Machine learning framework 480 together with models DB 485 may correspond to machine learning frameworks 380. For example, models DB 485 may store native libraries and model implementations that may be executed by machine learning framework 480 on behalf of machine learning modules 470. Machine learning system interface 490 may be configured to communicate with machine learning system 140. For example, if a user selects to provide machine learning data to machine learning system 140, machine learning system interface 490 may map user data to masked data using parameter maps stored in data map DB 495. Exemplary information that may be stored in data map DB 495 is described below with reference to FIG. 6D.

Although FIG. 4 shows exemplary components of UE device 110, in other implementations, UE device 110 may include fewer components, different components, additional components, or differently arranged components than depicted in FIG. 4. Additionally or alternatively, one or more components of UE device 110 may perform one or more tasks described as being performed by one or more other components of UE device 110.

Figure 5:
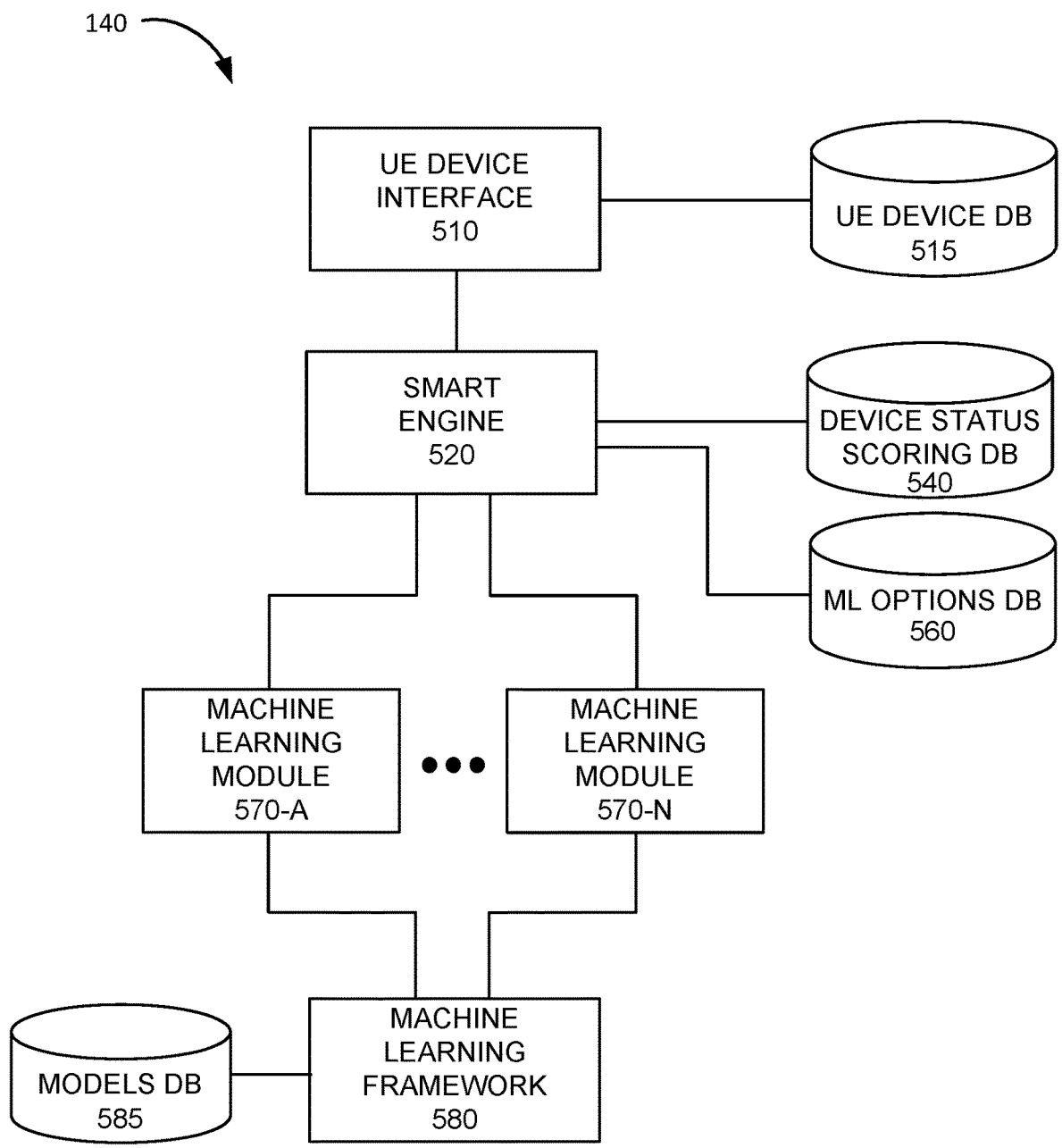
FIG. 5 is a diagram illustrating exemplary functional components of the machine learning system of FIG. 1.

FIG. 5 is a diagram illustrating exemplary functional components of machine learning system 140. The functional components of machine learning system 140 may be implemented, for example, via processing unit 220 executing instructions from memory 230. Alternatively, some or all of the functional components included in machine learning system 140 may be implemented via hard-wired circuitry. As shown in FIG. 5, machine learning system 140 may include a UE device interface 510, a UE device DB 515, a smart engine 520, a device status scoring DB 540, an ML options DB 560, one or more machine learning modules 570-A to 570-N, a machine learning framework 580, and a models DB 585.

UE device interface 510 may be configured to communicate with UE devices 110. UE device DB 515 may store profiles for UE devices 110 associated with users that gave permission to provide user data to machine learning system 140 to perform machine learning calculations.

Smart engine 520, device status scoring DB 540, ML options DB 560, machine learning module 570, machine learning framework 580, and models DB 585 may perform functions or store information similar to that described above with respect to smart engine 420, device status scoring DB 440, ML options DB 460, machine learning module 470, machine learning framework 480, and models DB 485, respectively, performed on machine learning system 140.

Although FIG. 5 shows exemplary components of machine learning system 140, in other implementations, machine learning system 140 may include fewer components, different components, additional components, or differently arranged components than depicted in FIG. 5. Additionally or alternatively, one or more components of machine learning system 140 may perform one or more tasks described as being performed by one or more other components of machine learning system 140.

Figure 6A:
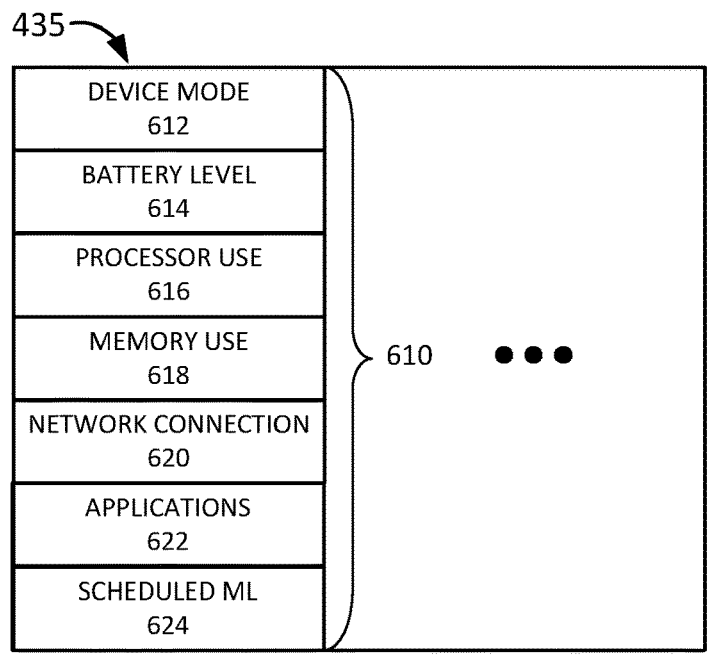
FIG. 6A is a diagram illustrating exemplary components of the device status database of FIG. 4.

FIG. 6A is a diagram illustrating exemplary components of device status DB 435. As shown in FIG. 6A, device status DB 435 may include one or more device status records 610. A particular device status record 610 may store device status information for a particular time period. For example, device status module 430 may record device status information at particular intervals. Thus, a particular device status record 610 may include the most recently obtained device status information. Device status record 610 may include a device mode field 612, a battery level field 614, a processor use field 616, a memory use field 618, a network connection field 620, an applications field 622, and a scheduled machine learning (ML) field 624.

Device mode field 612 may store information identifying a device mode associated with UE device 110. For example, device mode field 612 may identify an active mode, a sleep mode, an idle mode, a nap mode (e.g., an intermediate mode between idle mode and sleep mode), a deep sleep mode (e.g., a mode in which UE device 110 is set to the lowest clock cycle speed), and/or another device mode. Battery level field 614 may include information identifying a battery level associated with UE device 110, such as, for example, a percentage of battery power left. Processor use field 616 may include information identifying processor use/load for one or more processors associated with UE device 110. For example, processor use field 616 may identify the number of active processes, the percentage capacity, the percentage of overload time in a time period, percentage of idling time, and/or another measure of processor load for a CPU, GPU, and/or another processor in UE device 110.

Memory use field 618 may include information identifying memory use associated with UE device 110, such as the percentage of available memory and/or another measure of memory use. Network connection field 620 may store information identifying a measure of a connection quality associated with UE device 110. For example, network connection field 620 may identify a measure of a wireless connection to base station 125, a connection over a WiFi AP, and/or another type of connection. A measure of connection quality may include a packet loss rate value, a block error rate (BLER) value, a Reference Signal Receive Power (RSRP) value, a Received Signal Strength Indicator (RSSI) value, a pathloss value, a percent of time interval reaching maximum power value, an antenna reflected power value, an error rate value, a power headroom value, a data throughput value, a modulation and coding scheme (MCS) metric value, and/or another measure of connection quality.

Applications field 622 may include information identifying one or more applications 410 currently running on UE device 110. Furthermore, applications field 622 may include a criticality score for particular applications 410. A criticality score may identify how critical a particular application is. For example, a health monitoring application or a financial application may have a high criticality score and a gaming application may have a low criticality score. Scheduled ML field 624 may include information identifying scheduled machine learning processes. In some implementations, smart engine 420 may take the scheduled machine learning processes into account when selecting whether to run a particular machine learning process or when selecting options for a particular machine learning process.

Although FIG. 6A shows exemplary components and fields of device status DB 435, in other implementations, device status DB 435 may include fewer components, different components, additional components, or differently arranged components than depicted in FIG. 6A.

Figure 6B:
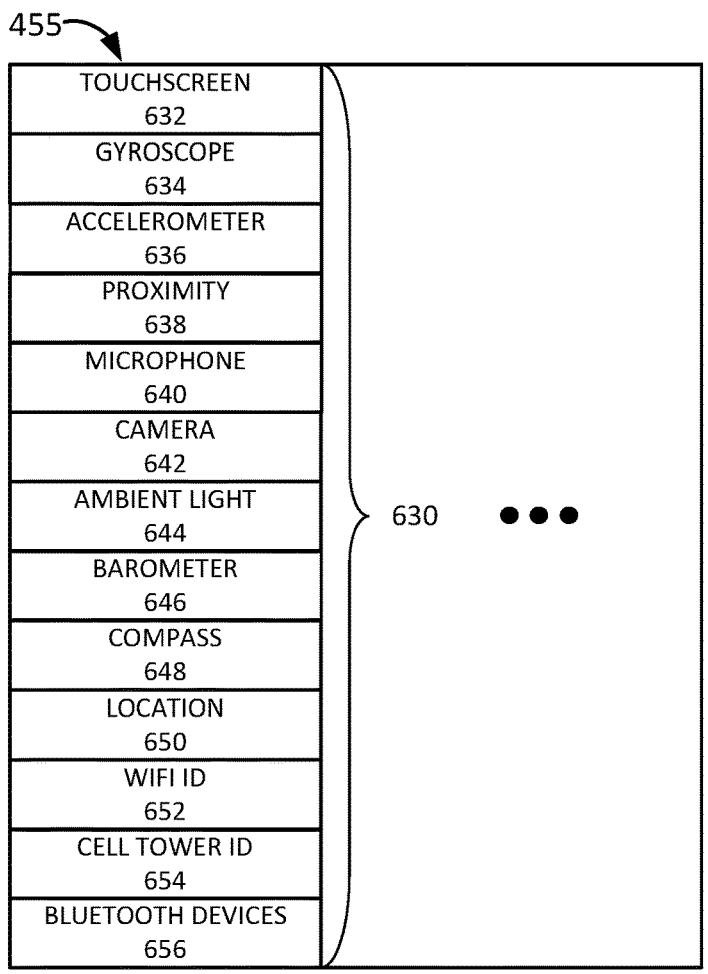
FIG. 6B is a diagram illustrating exemplary components of the device data database of FIG. 4.

FIG. 6B is a diagram illustrating exemplary components of device data DB 455. As shown in FIG. 6B, device data DB 455 may include one or more device data records 630. A particular device data record 630 may store device data information for a particular time period. For example, data acquisition module 450 may record device data from sensors and/or communication interface 260 at particular intervals. Thus, a particular device data record 630 may include the most recently obtained device data information. Device data record 630 may include a touchscreen field 632, a gyroscope field 634, an accelerometer field 636, a proximity field 638, a microphone field 640, a camera field 642, an ambient light field 644, a barometer field 646, a compass field 648, a location field 650, a WiFi identifier (ID) field 652, a cell tower ID field 654, and a Bluetooth devices field 656.

Touchscreen field 632 may store data obtained from a touchscreen associated with UE device 110. For example, touchscreen field 632 may store data obtained from a touchscreen event, such as the pressure, speed, and/or direction associated with a gesture made by a user on the touchscreen. Gyroscope field 634 may store data obtained from a gyroscope associated with UE device 110, such as, for example, data obtained based on a movement of UE device 110 made by the user. Accelerometer field 636 may store data obtained from an accelerometer associated with UE device 110, such as, for example, data obtained based on a movement of UE device 110 made by the user.

Proximity field 638 may store data obtained from a proximity sensor associated with UE device 110. Microphone field 640 may store data obtained from a microphone associated with UE device 110, such as, for example, audio capture of a user's voice. Camera field 642 may store data obtained from a camera associated with UE device 110, such as, for example, image and/or video data obtained of a user's face, of the user's environment, and/or other types of images and/or video data. Ambient light field 644 may store data obtained from an ambient light detector associated with UE device 110. Barometer field 646 may store air pressure data obtained from a barometer associated with UE device 110.

Compass field 648 may store directional data obtained from an electronic compass associated with UE device 110.

Location field 650 may store location information obtained from a positional receiver such as a GPS receiver associated with UE device 110. WiFi ID field 652 may store IDs associated with WiFi APs detected by UE device 110. For example, WiFi ID field 652 may store WiFi Media Access Control (MAC) addresses associated with the WiFi APs, WiFi Service Set IDs (SSIDs) associated with the WiFi APs, assigned names to the WiFi APs, and/or other types of WiFi IDs. Cell tower ID field 654 may store an ID associated with base station 125, such as an eNodeB ID (e.g., a 20-28 bit eNodeB ID). Bluetooth devices field 656 may store IDs associated with Bluetooth devices connected to UE device 110, such as Bluetooth Universally Unique IDs (UUIDs).

Although FIG. 6B shows exemplary components and fields of device data DB 455, in other implementations, device data DB 455 may include fewer components, different components, additional components, or differently arranged components than depicted in FIG. 6B.

FIG. 6C is a diagram illustrating exemplary components of device status scoring DB 440 or 540. As shown in FIG. 6C, device status scoring DB 440 or 540 may include a device parameter column 660, a parameter value column 662, a value range column 664, and a score column 666.

Device parameter column 660 may identify a particular device status parameter, such as any of the parameters stored in device data DB 455. Parameter value column 662 may identify a particular value level, such as low, medium, high, etc., for a corresponding device status parameter and value range column 664 may identify a particular value range associated with the particular value level, such as a particular percentage range. Score column 666 may identify a score assigned to the corresponding value level for a particular device status parameter. The scores may be used by smart engine 420 to manage machine learning services on UE device 110.

Although FIG. 6C shows exemplary components of device status scoring DB 440 or 540, in other implementations, device status scoring DB 440 or 540 may include fewer components, different components, additional components, or differently arranged components than depicted in FIG. 6C.

FIG. 6D is a diagram illustrating exemplary components of data map DB 495. As shown in FIG. 6D, data map DB 495 may include one or more data map records 670. Each data map record 670 may store a mapping for a particular parameter (e.g., a particular data source). Data map record 670 may include a set of parameter values 672-A to 672-X and a corresponding set of masked values 674-A to 674-X. For example, a first data map record 670 may include location coordinates values, a second data map record 670 may include WiFi AP MAC address values, a third data map record 670 may include cell tower ID values, etc.

The masked values may be selected to ensure there is no redundancy in the mapping, so that different parameter values do not map to a same masked value. Each time a new parameter value is generated (e.g., based on obtaining a data value from a sensor or from communication interface 260 associated with UE device 110), a new masked value may be generated for the new parameter value. For example, when a user initially activates behavioral authentication on UE device 110, the coordinates of the location of UE device 110 may be mapped to a first masked value (e.g., a value of 0) and when UE device 110 is at a different location at a later time, the new location may be added to data map record 670 for the location parameter.

The masked values, along with timestamps indicating a time when the original parameter values were obtained, may be used to perform machine learning processes. For example, the masked data values may be sent to machine learning system 140. The masked data values may be encrypted before being sent over the network to machine learning system 140. Furthermore, data map DB 495 may be stored on UE device 110 in an encrypted form. Furthermore, the use of masked values to perform machine learning may increase the calculation speed of the machine learning, since the masked values may be integers instead of floating or double variable types used for location coordinates or WiFi AP MAC addresses.

Although FIG. 6D shows exemplary components of data map DB 495, in other implementations, data map DB 495 may include fewer components, different components, additional components, or differently arranged components than depicted in FIG. 6D.

Figure 6E:
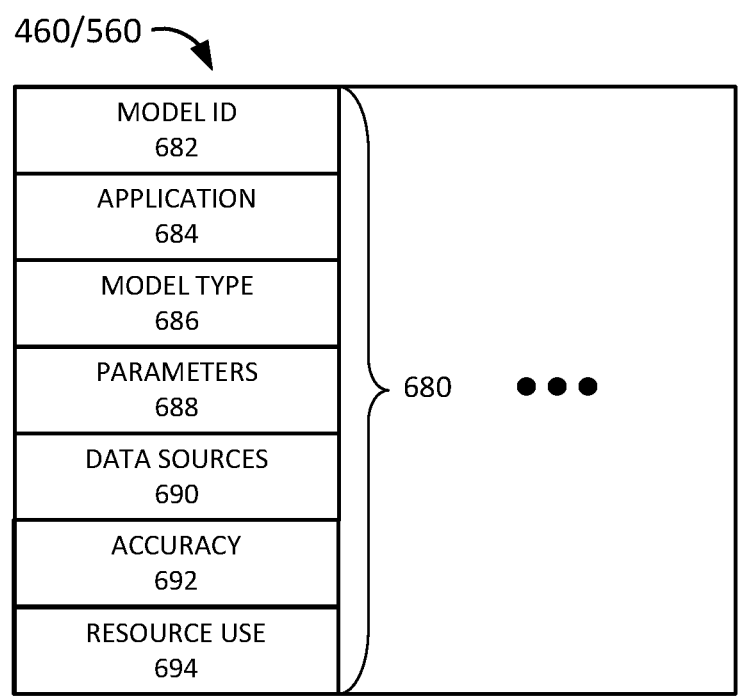
FIG. 6E is a diagram illustrating exemplary components of the machine learning options database of FIG. 4 or FIG. 5.

FIG. 6E is a diagram illustrating exemplary components of ML options DB 460 or 560. As shown in FIG. 6E, ML options DB 460 or 560 may include one or more machine learning module records 680. Each machine learning module record 680 may store information relating to a particular set of options for a machine learning model. Machine learning module record 680 may include a model ID field 682, an application field 684, a model type field 686, a parameters field 688, a data sources field 690, an accuracy field 692, and a resource use field 694.

Model ID field 682 may include an ID that uniquely identifies a particular machine learning module 470 or 570 along with set of options for the particular machine learning module 470 or 570. Application field 684 may identify one or more applications 410 associated with the particular machine learning module 470 or 570. Application field 684 may be used by smart engine 420 or 520 to select an appropriate machine learning module 470 or 570 when a particular application 410 requests machine learning services.

Model type field 686 may identify a particular model, classifier, and/or algorithm associated with the particular machine learning module 470 or 570. For example, model type field 686 may identify the particular model, classifier, and/or algorithm as a K-nearest neighbor classifier, a naïve Bayesian classifier, a logical regression classifier, a neural network classifier, an SVM classifier, a decision tree classifier, a maximum entropy classifier, a kernel density estimation classifier, and/or another type of classifier. Furthermore, model type field 686 may identify whether the particular model, classifier, and/or algorithm is trained using supervised learning (e.g., a labeled training set) or unsupervised learning (e.g., an unlabeled training set).

Parameters field 688 may identify one or more parameters associated with the particular model, classifier, and/or algorithm. For example, parameters field 688 may identify a K value for a K-nearest neighbors algorithm, a number of model coefficients for a logistic regression algorithm, a number of dimensions for an SVM algorithm, a number of nodes for a neural network algorithm, one or more hyper-parameters for a neural network algorithm, a number of nodes for a decision tree algorithm, and/or other types of parameters for a machine learning algorithm.

Data sources field 690 may identify one or more data sources associated with the particular machine learning module 470 or 570. For example, data sources field 690 may identify one or more available data sources specified in device data DB 455. Furthermore, for each identified data source, data sources field 690 may identify whether the identified data source corresponds to a dominant factor, a non-dominant factor, a resource-intense factor, or a non-resource-intense factor with respect to the particular model, classifier, and/or algorithm.

Accuracy field 692 may store a value corresponding to a measure of accuracy associated with the particular machine learning module 470 or 570. As an example, accuracy field 692 may store a numerical score for the measure of accuracy. As another example, accuracy field 692 may include a set of values, such as values associated with a receiver operating characteristic (ROC) curve for the particular machine learning module 470 or 570. Resource use field 694 may store a value corresponding to a measure of the amount of resources expected to be used by the particular machine learning module 470 or 570, such as processor use, memory use, network bandwidth use, and/or use of another resource of UE device 110. The measure of resource use may be based on the computational complexity associated with the particular model, classifier, and/or algorithm, the types and number of data sources used, and/or other factors.

Although FIG. 6E shows exemplary components of ML options DB 460 or 560, in other implementations, ML options DB 460 or 560 may include fewer components, different components, additional components, or differently arranged components than depicted in FIG. 6E.

Figure 7:
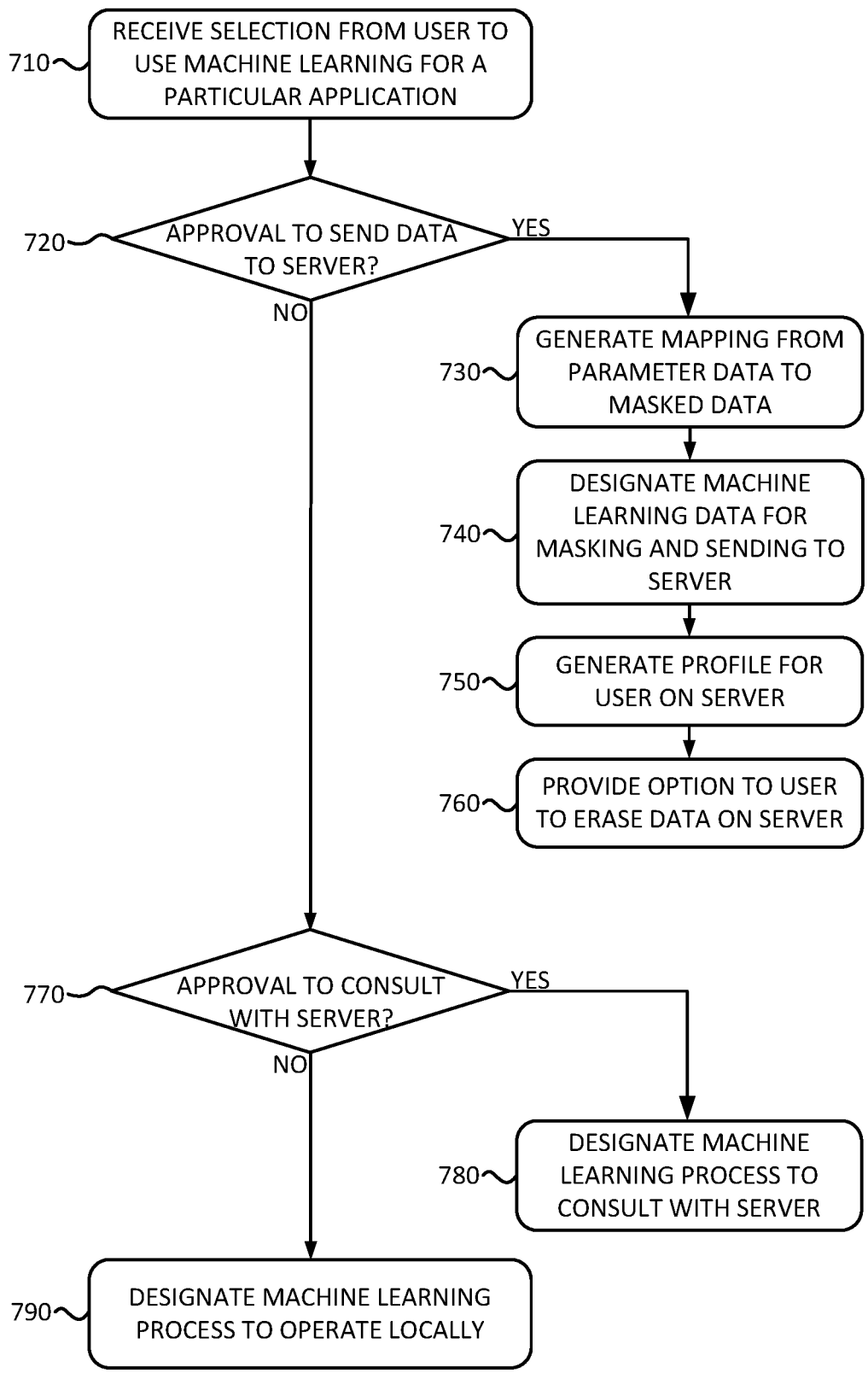
FIG. 7 is a flowchart of a process for configuring machine learning options according to an implementation described herein.

FIG. 7 is a flowchart of a process for configuring machine learning options according to an implementation described herein. In some implementations, the process of FIG. 7 may be performed by UE device 110. In other implementations, some or all of the process of FIG. 7 may be performed by another device or a group of devices separate from UE device 110.

The process of FIG. 7 may include receiving a selection from a user to use machine learning for a particular application (block 710). For example, a user of UE device 110 may select to use machine learning for a behavioral authentication application, an image processing application that performs pattern recognition, a gaming application, a speech recognition application, a natural language processing application, a health monitoring application, a text auto-correct/auto-complete application, a sentiment analysis application, an application that optimizes user settings and/or preferences on UE device 110, a financial analysis application, a targeted advertising application, and/or another type of application that may utilize machine learning.

A determination may be made as to whether the user has selected to give approval to send information to a server (block 720). For example, smart engine 420 may determine whether the user has selected to approve to send information to machine learning system 140 to perform machine learning calculations. If approval to send data to the server was received (block 720—YES), a mapping may be generated from parameter data to masked data (block 730) and machine learning data may be designated for masking and sending to the server (block 740). For example, smart engine 420 may instruct machine learning system interface 490 to generate one or more new data map records 670 in data map DB 495 for parameters used by the machine learning process and may designate the parameters for masking and sending to machine learning system 140. Furthermore, smart engine 420 may inform machine learning system 140 that the user has selected to send data to machine learning system 140 and machine learning system 140 may generate a profile for UE device 110 associated with the user in UE device DB 515 (block 750). The user may be provided with an option to erase the data on the server (block 760). For example, the user may be provided with an option to erase any data sent to machine learning system 140 in connection with performing machine learning services for UE device 110.

Returning to block 720, if approval to send data to the server was not received (block 720—NO), a determination may be made as to whether the user has selected to give approval to consult or communicate with the server, use the server, or perform machine learning or verify machine learning predictions/recommendations (block 770). For example, the user may not approve sending data to machine learning system 140, but may approve smart engine 420 to communicate with machine learning system 140 in connection with performing machine learning calculations or verifying machine learning predictions or recommendations. If it is determined that the user has given approval to consult with the server (block 770—YES), the machine learning application may be designated to consult with the server. As an example, smart engine 420 may use machine learning system 140 to perform cloud computing when performing machine learning calculations. As another example, smart engine 420 may verify a decision, prediction, and/or inference by communicating with machine learning system 140. Rather than providing user data to machine learning system 140, smart engine 420 may provide information relating to the options selected for the machine learning process and machine learning system 140 estimates an accuracy of the decision, prediction, and/or inference and may provide the estimate of accuracy to smart engine 420.

If it is determined that the user has not given approval to consult with or use the server (block 770—NO), the machine learning process may be designated to operate locally. For example, smart engine 420 may select to perform calculations relating to the machine learning process using machine learning framework 480 and models DB 485.

Figure 8:
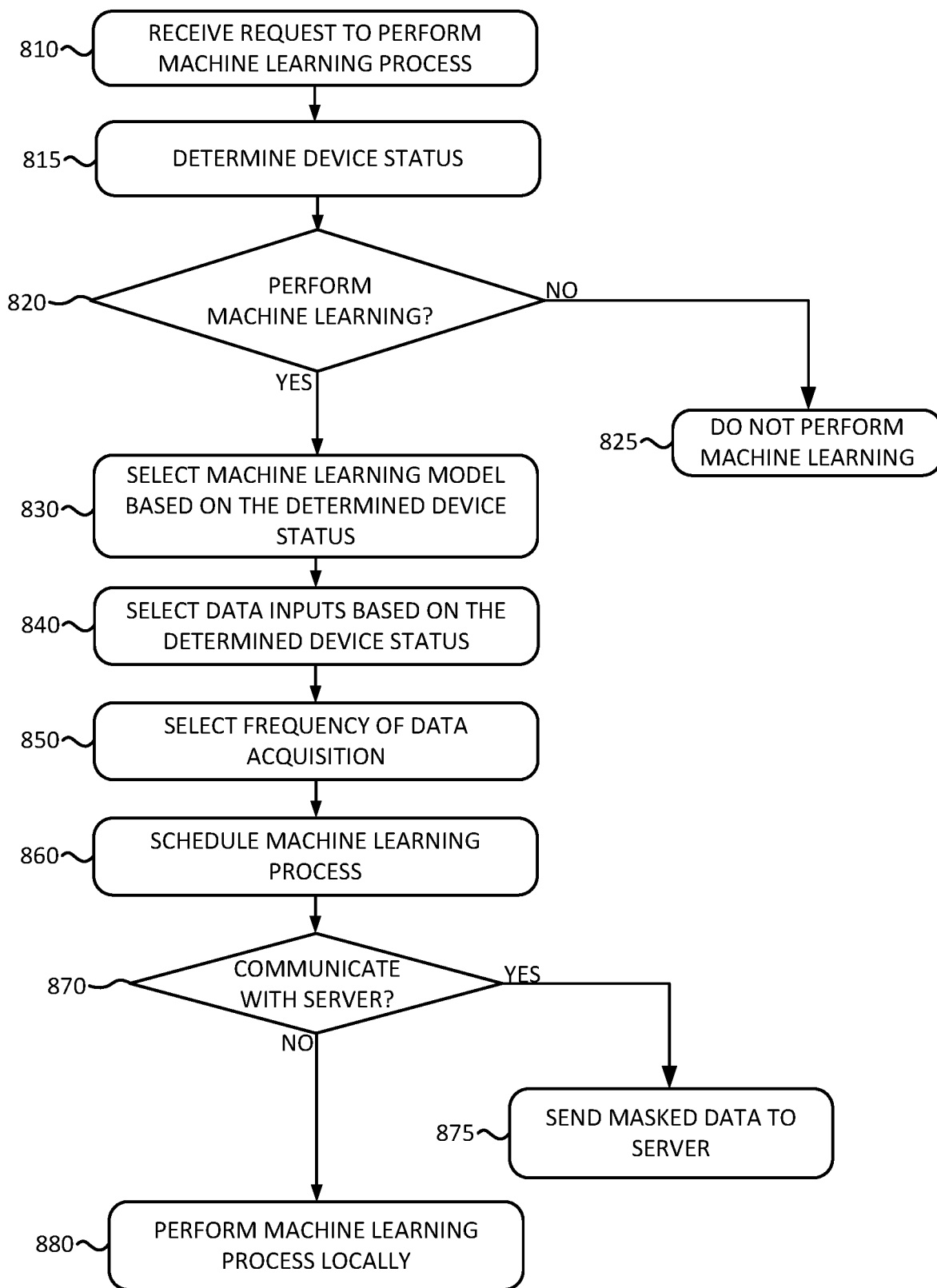
FIG. 8 is a flowchart of a process for performing machine learning according to an implementation described herein.

FIG. 8 is a flowchart of a process for performing machine learning according to an implementation described herein. In some implementations, the process of FIG. 8 may be performed by UE device 110. In other implementations, some or all of the process of FIG. 8 may be performed by another device or a group of devices separate from UE device 110.

The process of FIG. 8 may include receiving a request to perform a machine learning process (block 810). For example, smart engine 420 may receive a request for a machine learning service from a behavioral authentication application, an image processing application that performs pattern recognition, a gaming application, a speech recognition application, a natural language processing application, a health monitoring application, a text auto-correct/auto-complete application, a sentiment analysis application, an application that optimizes user settings and/or preferences on UE device 110, a financial analysis application, a targeted advertising application, and/or another type of application that may utilize machine learning.

In response, device status may be determined (block 815). For example, smart engine 420 may obtain device status information from device status module 430, such as a device mode, a battery level value, a processor load value, a memory use value, a network connection quality value, one or more application criticality values for an application running on UE device 110, and/or other types of device status information. Additionally, smart engine 420 may obtain device data from data acquisition module 450. The information from data acquisition module 450 may be used to determine whether particular parameters have changed within a time period, such as a last time a machine learning process was performed.

A determination may be made as to whether to perform machine learning (block 820). As an example, smart engine 420 may determine whether machine learning needs to be performed based on a change in one or more parameters associated with the requested machine learning process (e.g., location, cell tower ID, WiFi AP ID, Bluetooth devices ID for behavioral authentication, etc.). As another example, smart engine 420 may determine whether the device status indicates that UE device 110 has adequate resources (e.g., sufficient battery level, sufficient processor capacity, sufficient memory, sufficient network connection quality, etc.) to perform the requested machine learning process. In some implementations, smart engine 420 may determine one or more of a battery level score, a processor load score, a memory use score, and/or a connection quality score and may compute a weighted sum of the determined score to determine a device status score for UE device 110. In other implementations, the particular scores may be processed individually in a particular order and smart engine 420 may make a decision based on processing the particular scores individually in the particular order.

If it is determined that machine learning is not to be performed (block 820—NO), machine learning may not be performed (block 825). For example, smart engine 420 may select not to perform the requested machine learning process. If it is determined that machine learning is to be performed (block 820—YES), a machine learning model may be selected based on the determined device status (block 830). Smart engine 420 may select a particular machine learning module 470 and/or one or more options for the particular machine learning module 470 based on the determined device status to match an expected resource use of the selected machine learning module 470 with the current resource capacity of the wireless communication device associated with the determined device status. For example, smart engine 420 may select a particular machine learning model/classifier/algorithm and/or a particular accuracy and resource use requirement for the particular machine learning model/classifier/algorithm. Smart engine 420 may select a low accuracy model when the device status is associated with a device status score below a device status score threshold or may select a high accuracy model when the device status is associated with a device status score above the device status score threshold.

Data inputs may be selected based on the determined device status (block 840). For example, smart engine 420 may select one or more data inputs for the selected machine learning module 470 based on the determined device status. As an example, if the device status indicates a low resource availability for UE device 110 (e.g., low battery level, high processor load, high memory use, etc.) smart engine 420 may select data inputs corresponding to dominant and non-resource-intense factors. As another example, if the device status indicates a high resource availability for UE device 110 (e.g., UE device is in idle mode, high battery level, low processor load, low memory use, etc.) smart engine 420 may select data inputs corresponding to dominant and non-dominant factors and/or corresponding to non-resource-intense factors and resource-intense factors.

Smart engine 420 may select a data input designated as a dominant factor or a non-resource-intense factor (i.e., may select fewer factors) when the device status is associated with a device status score below a device status score threshold or may select a data input designated as a non-dominant factor or a resource-intense factor (i.e., may select more factors) when the device status is associated with a device status score above the device status score threshold.

Furthermore, smart engine 420 may select a first number of data inputs when the device status is associated with a device status score below a device status score threshold or may select a second number of data inputs, higher than the first number, when the device status is associated with a device status score above the device status score threshold.

Frequency of data acquisition may be selected (block 850). For example, smart engine 420 may select a frequency of data acquisition for the selected one or more data inputs based on the determined device status, such as selecting a higher frequency of data acquisition if the device status indicates a high resource availability for UE device 110 and a lower frequency of data acquisition if the device status indicates a low resource availability for UE device 110.

The machine learning process may be scheduled (block 860). As an example, smart engine 420 may schedule to perform the machine learning process to be performed immediately. As another example, smart engine 420 may schedule to perform the machine learning process when UE device 110 enters a particular device state, such as a particular device mode, a particular battery level score, a particular processor load score, a particular memory usage score, a particular network connection quality score, a particular application criticality score, and/or another type of device state. As yet another example, smart engine 420 may prioritize multiple requested machine learning processes and rank the requested machine learning processes in the order in which they are to be performed. For example, smart engine 420 may rank the requested machine learning processes based on criticality scores associated with the applications 410 associated with the requested machine learning processes.

A determination may be made as to whether to communicate with the server (block 870). As an example, smart engine 420 may determine whether the user has selected to approve sending data to machine learning system 140. As another example, smart engine 420 may determine whether a network connection quality score is above a particular network connection quality score threshold. If it is determined to communicate with the server (block 870—YES), masked data may be sent to the server (block 875). For example, machine learning system interface 490 may map one or more parameters associated with the selected one or more data sources to masked values using data map DB 495 and may send the masked data to machine learning system 140 for performing the machine learning process.

If it is determined not to communicate with the server (block 870—NO), the machine learning process may be performed locally (block 880). For example, smart engine 420 may instruct the selected machine learning module 470 to perform the machine learning process. Machine learning module 470 may use machine learning framework 480 and models DB 485 to perform the requested machine learning process.

Figure 9:
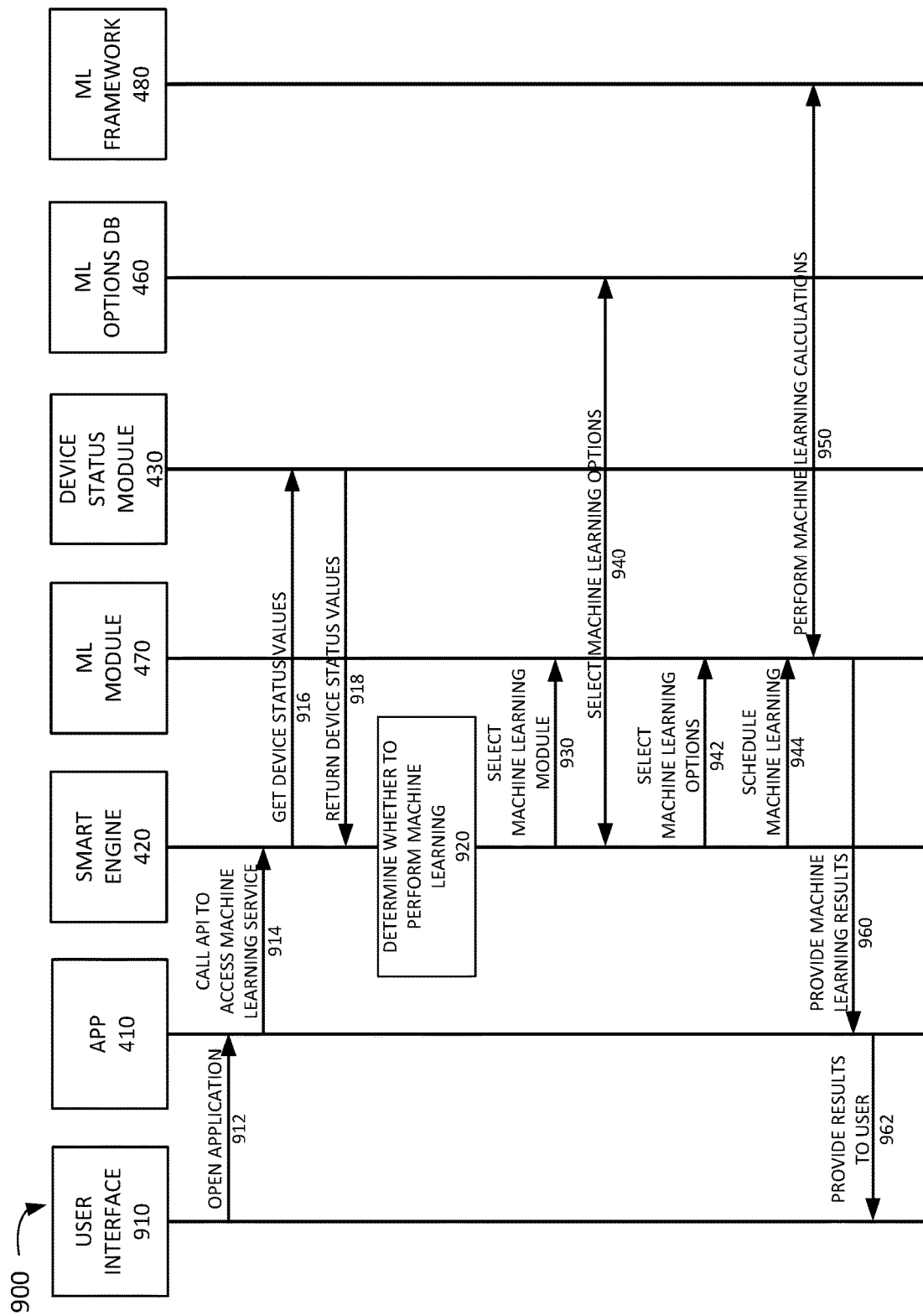
FIG. 9 is a diagram of an exemplary signal flow according to an implementation described herein.

FIG. 9 is a diagram of an exemplary signal flow 900 according to an implementation described herein. As shown in FIG. 9, signal flow 900 may include a user opening application 410 via user interface 910 (signal 912). For example, assume the user activates a financial application and the financial application selects, in addition to authenticating the user via a login process, to perform behavioral authentication using a machine learning module trained to perform behavioral authentication based on the user's behavior patterns. Thus, application 410 may call an API to request a machine learning service to perform behavioral authentication via smart engine 420 (signal 914). Smart engine 420 may then obtain device status data from device status module 430 (signals 916 and 918). Smart engine 420 may then determine whether to perform the requested machine learning process based on the obtained device status data (block 920). Assume smart engine 420 determines to perform the machine learning process.

Smart engine 420 may then select a machine learning module 470 (signal 930) and then select an option for the selected machine learning module 470 by accessing ML options DB 460 (signal 940) and using the information in ML options DB 470 relating to the available options to select the options for machine learning module 470 (signal 942). For example, smart engine 420 may select a particular model/classifier/algorithm and one or more data sources for machine learning module 470. Smart engine 420 may then schedule the machine learning process to take place (signal 944). For example, smart engine 420 may schedule the machine learning process to take place when the processor load drops below a particular value.

Machine learning module 470 may perform the machine learning process at the scheduled time using the machine learning framework 480 (signal 950). For example, machine learning module 470 may perform behavioral authentication for the user using the location of UE device 110, cell ID associated with base station 125, MAC addresses of detected WiFi APs, a pressure, speed, and direction of a touch event on the touchscreen of UE device 110, and/or a gait pattern analysis based on data obtained from an accelerometer. Assume the machine learning process authenticates the user based on the obtained data. Thus, machine learning module 470 may provide the result of the behavioral authentication to application 410 (signal 960) and application 410 may provide the results to the user via user interface 910, informing the user that the user has been authenticated (signal 962).

Figure 10:
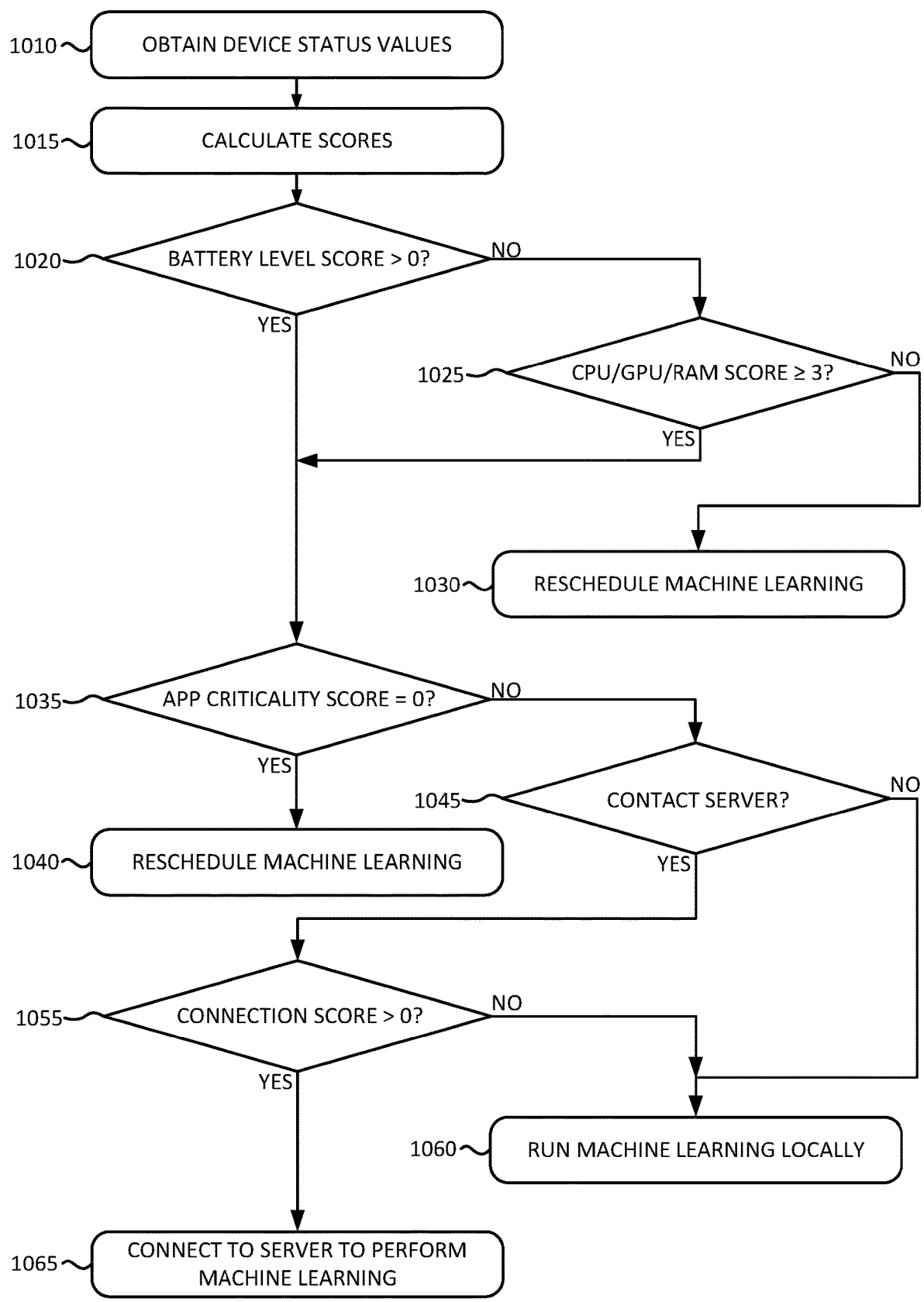
FIG. 10 is a flowchart of a first exemplary machine learning process according to an implementation described herein.

FIG. 10 is a flowchart of an exemplary machine learning process according to an implementation described herein. In some implementations, the process of FIG. 10 may be performed by UE device 110. In other implementations, some or all of the process of FIG. 10 may be performed by another device or a group of devices separate from UE device 110. In the exemplary machine learning process of FIG. 10, scores from device status scoring DB 440 are used to determine whether to run a machine learning process and whether to run the machine learning process locally or using machine learning system 140. In the process of FIG. 10, battery level is treated as the most important factor, followed by processor and memory load, criticality of application running on UE device 110, and the network connection quality.

The process of FIG. 10 may include obtaining device status values (block 1010) and calculating scores (block 1015). For example, smart engine 420 may obtain the battery level, processor load, memory use, network connection quality, and application criticality values from device status module 430 and may calculate scores for these parameters using device status scoring DB 440. A determination may be made whether the battery level score is greater than zero (block 1020). If it is determined that the battery level is not greater than zero (block 1020—NO), a determination may be made whether the combined CPU, GPU, and RAM use score is greater than or equal to three (block 1025). A combined CPU/GPU/RAM score of three, for example, may be used as a threshold value for having adequate resources to perform machine learning. If it is determined that the combined CPU/GPU/RAM score is not greater than three (block 1025—NO), the machine learning may be rescheduled to a later time, when the battery level and CPU/GPU/RAM scores are higher (block 1030). It is to be understood that the combined CPU/GPU/RAM score can also be based on only one element. e.g., CPU or GPU or RAM or any combination of one or all items.

Returning to blocks 1020 and 1025, if the battery level is greater than zero (block 1020—YES), or if the combined CPU/GPU/RAM score is greater than or equal to three (block 1025—YES), a determination may be made whether the application criticality score is equal to zero (block 1035). If the application criticality is zero (block 1035—YES), no critical applications may be running and the machine learning may be rescheduled to a later time (block 1040). If the application criticality is greater than zero (block 1035—NO), a determination may be made as to whether to contact the server (block 1045). For example, smart engine 420 may determine whether the user privacy settings indicate that the user has given permission to send information to machine learning system 140.

If it is determined to not contact the server (block 1045—NO), the machine learning may be run locally (block 1060). For example, smart engine 420 may select a machine learning module 470 and machine learning module 470 may perform the machine learning process using machine learning framework 480. If it is determined to contact the server (block 1045—YES), a determination may be made as to whether the connection score is greater than zero (block 1055). If it is determined that the connection score is not greater than zero (block 1055—NO), the machine learning may be run locally (block 1060). For example, smart engine 420 may determine that the connection is not of a sufficient quality to communicate with machine learning system 140. If it is determined that the connection score is greater than zero (block 1055—YES), a connection may be made to the server to perform machine learning (block 1065). For example, smart engine 420 may send data from selected data sources to machine learning system 140 and machine learning system 140 may perform the machine learning process and provide the results of the machine learning process, such as a decision, prediction, and/or inference, to UE device 110.

Figure 11:
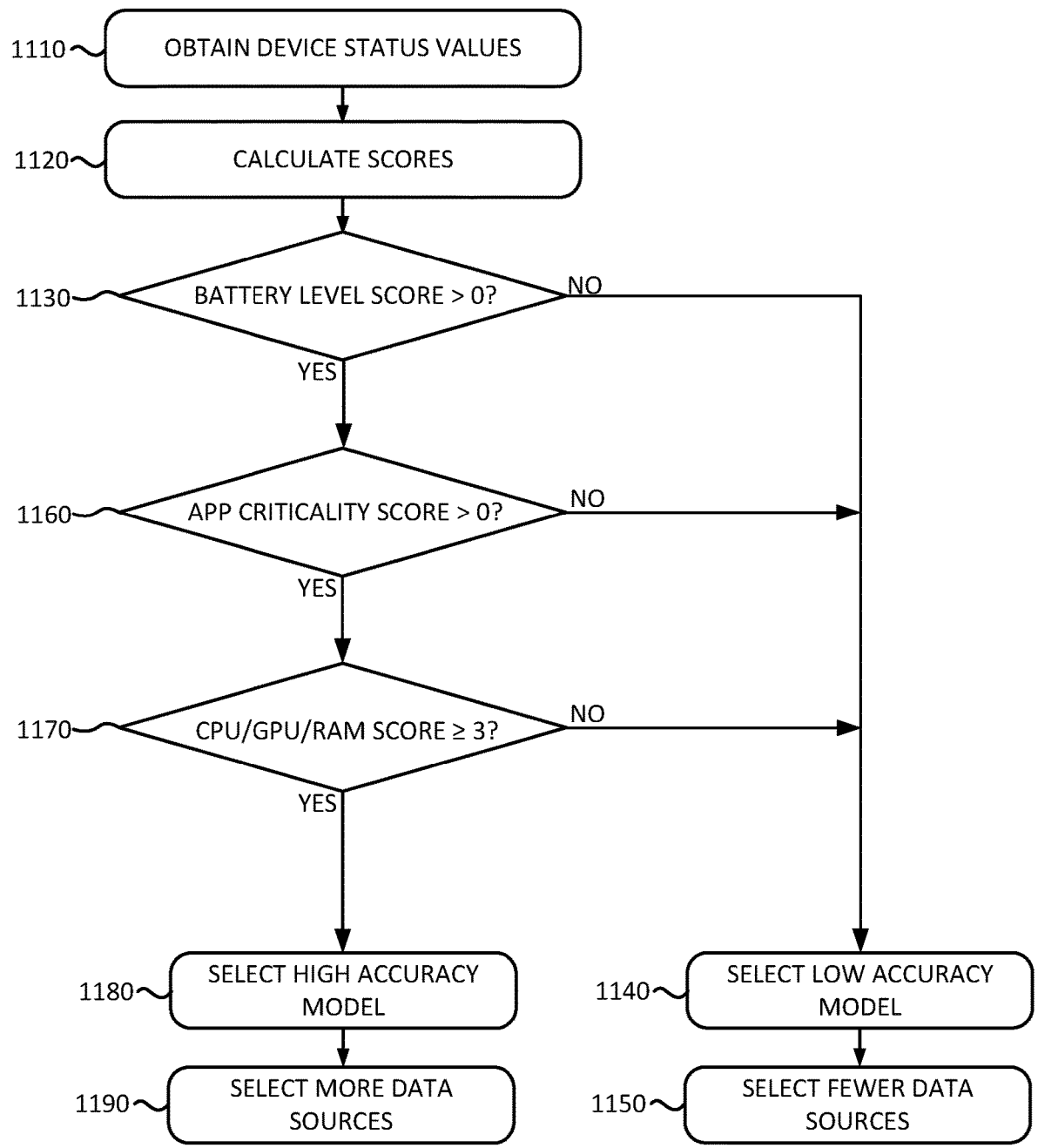
FIG. 11 is a flowchart of a first exemplary machine learning process according to an implementation described herein.

FIG. 11 is a flowchart of an exemplary machine learning process according to an implementation described herein. In some implementations, the process of FIG. 11 may be performed by UE device 110. In other implementations, some or all of the process of FIG. 11 may be performed by another device or a group of devices separate from UE device 110. In the process of FIG. 11, device status and the scores for the battery level, application criticality, processor load, and memory usage are used by smart engine 420 to select data sources and machine learning models.

The process of FIG. 11 may include obtaining device status values (block 1110) and calculating scores (block 1120). For example, smart engine 420 may obtain the battery level, processor load, memory use, network connection quality, and application criticality values from device status module 430 and may calculate scores for these parameters using device status scoring DB 440. A determination may be made whether the battery level score is greater than zero (block 1020).

If it is determined that the battery level is not greater than zero (block 1130—NO), a low accuracy model may be selected (block 1140) and fewer data sources may be selected (block 1150). As an example, smart engine 420 may select a particular machine learning module 470 associated with a less computationally complex model, such as a K-nearest neighbors model, a logical regression model, or a naïve Bayesian model. As another example, smart engine 420 may select a particular machine learning module 470 associated with a particular type of model with fewer parameters, such as a K-nearest neighbor model with a small value of K, an SVM model with a small number of dimensions, a neural network with fewer nodes, etc. Furthermore, smart engine 420 may select fewer data sources. For example, smart engine 420 may select dominant and non-resource-intense factors. For example, if performing a behavioral authentication machine learning process, smart engine 420 may select to use a touchscreen data source and may select not to use an accelerometer data source.

Returning to block 1130, if it is determined that the battery level is greater than zero (block 1130—YES), a determination may be made as to whether the application criticality score is greater than zero (block 1160). If it is determined that the application criticality score is not greater than zero (block 1160—NO), a low accuracy model may be selected (block 1140) and fewer data sources may be selected (block 1150). If it is determined that the application criticality score is greater than zero (block 1160—YES), a determination may be made as to whether the combined CPU, GPU, and RAM use score is greater than or equal to three (block 1170). If it is determined that the combined CPU/GPU/RAM score is not greater than three (block 1170—NO), a low accuracy model may be selected (block 1140) and fewer data sources may be selected (block 1150).

If it is determined that the combined CPU/GPU/RAM score is greater than three (for example) (block 1170—YES), a high accuracy model may be selected (block 1180) and more data sources may be selected (block 1190). As an example, smart engine 420 may select a particular machine learning module 470 associated with a computationally complex model, such as a neural network or a SVM model. As another example, smart engine 420 may select a particular machine learning module 470 associated with a particular type of model with more parameters, such as a K-nearest neighbor model with a high value of K, an SVM model with a large number of dimensions, a neural network with more nodes, etc. Furthermore, smart engine 420 may select more data sources. For example, smart engine 420 may select dominant and non-dominant factors, and may select resource-intense factors. For example, if performing a behavioral authentication machine learning process, smart engine 420 may select to use a touchscreen data source, an accelerometer data source, a gyroscope data source, and a microphone data source.

Figure 12:
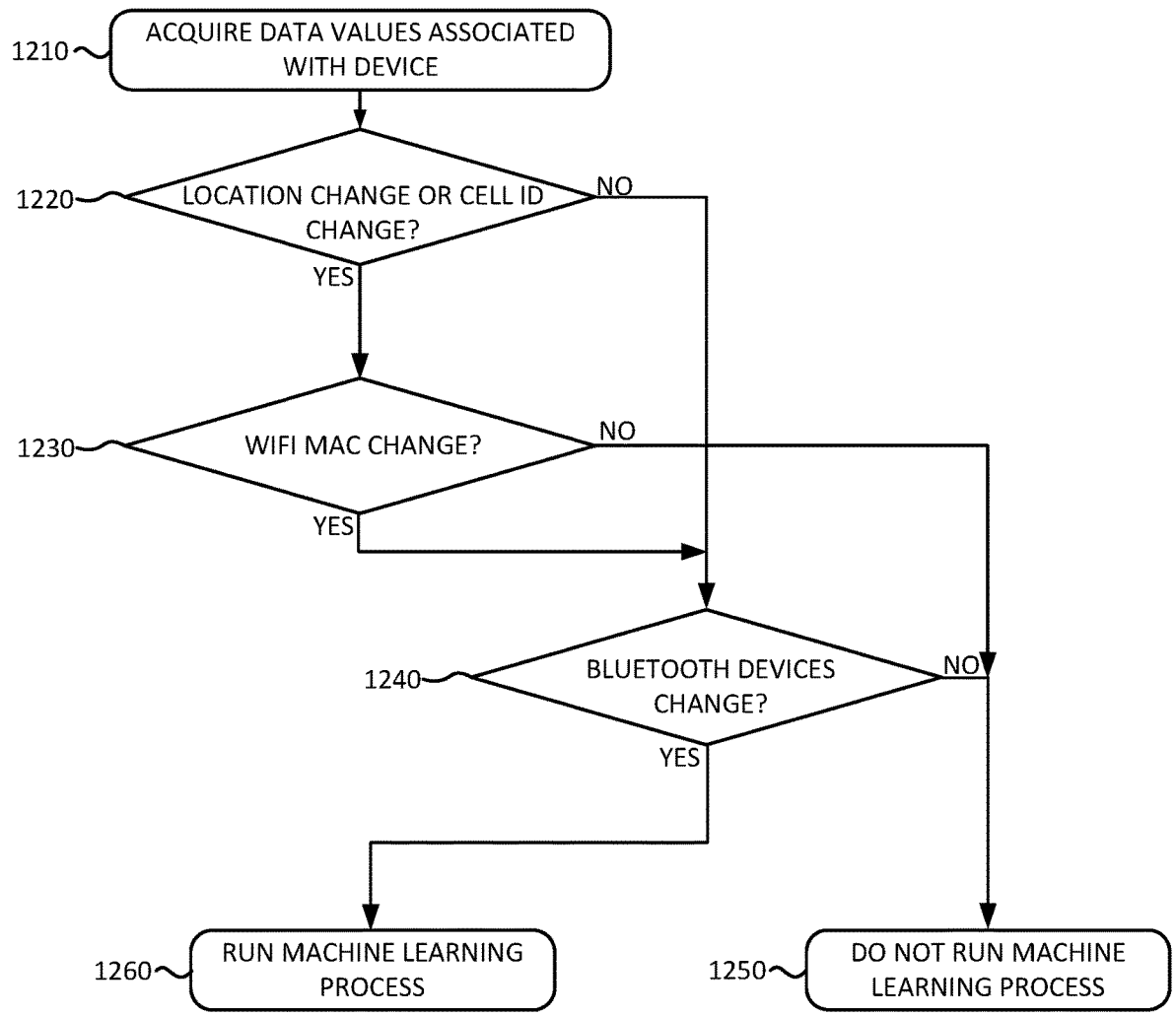
FIG. 12 is a flowchart of a first exemplary machine learning process according to an implementation described herein.

FIG. 12 is a flowchart of an exemplary machine learning process according to an implementation described herein. In some implementations, the process of FIG. 12 may be performed by UE device 110. In other implementations, some or all of the process of FIG. 12 may be performed by another device or a group of devices separate from UE device 110. In the process of FIG. 12, device location information and device connection types are used to check whether a machine learning service needs to be run for behavioral authentication since the last time that behavioral authentication was performed. For example, when the location of UE device 110 has not changed since the last time behavioral authentication was performed, and the Bluetooth devices connected to UE device 110 have not changed either, smart engine 420 may determine that there is no need to perform another behavioral authentication. Thus, the bounded Bluetooth devices may be used as a second factor to authenticate the user of UE device 110.

The process of FIG. 12 may include acquiring data values associated with the device (block 1210). For example, smart engine 420 may obtain, from data acquisition module 450, location information for UE device 110, a cell tower ID for base station 125, one or more MAC addresses for WiFi APs detected by UE device 110, and IDs of Bluetooth devices connect to UE device 110. A determination may be made as to whether there was a location change or a cell ID change (block 1220). For example, smart engine 420 may compare the location fields 650 and cell tower ID fields 654 of device data records 630 for a most recently obtained device data record 630 and for a device data record 630 for when behavioral authentication was last performed.

If it is determined that there was a change in the location or cell tower ID (block 1220—YES), a determination may be made as to whether there was a change in the WiFi MAC addresses of detected WiFi APs (block 1230). For example, smart engine 420 may compare the WiFi ID fields 652 of device data records 630 for a most recently obtained device data record 630 and for a device data record 630 for when behavioral authentication was last performed.

If it is determined that there was a change in the WiFi MAC address (block 1230—YES), a determination may be made as to whether there was a change in the Bluetooth devices connected to UE device 110 (block 1240). Similarly, returning to block 1220, if it is determined that there was no change in the location or cell tower ID (block 1220—NO), a determination may be made as to whether there was a change in the Bluetooth devices connected to UE device 110 (block 1240). For example, smart engine 420 may compare the Bluetooth devices fields 656 of device data records 630 for a most recently obtained device data record 630 and for a device data record 630 for when behavioral authentication was last performed.

If it is determined that there was no change in the Bluetooth devices connected to UE device 110 (block 1240—NO), or if it is determined that there was no change in the WiFi MAC address (block 1230—NO), smart engine 420 may determine that there is no need to run a machine learning process to perform behavioral authentication (block 1250). If it is determined that there was a change in the Bluetooth devices connected to UE device 110 (block 1240—YES), smart engine 420 may select to run a machine learning process to perform behavioral authentication (block 1260).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7, 8, 10, 11, and 12, and a series of signal flows has been described with respect to FIG. 9, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a wireless communication device, the method comprising:
   determining a device status score for the wireless communication device, wherein the device status score indicates a current resource capacity of the wireless communication device;
   selecting a machine learning model based on the determined device status score to match an expected resource use of the selected machine learning model with the current resource capacity of the wireless communication device, wherein the machine learning model corresponds to a first model when the device status score is below a device status score threshold and a second model when the device status score is above the device status score threshold; and
   performing a machine learning process using the selected machine learning model.

2. The method of claim 1, further comprising:
selecting one or more data inputs based on the determined device status score; and wherein performing the machine learning process using the selected machine learning model includes using the selected one or more data inputs.

3. The method of claim 2, wherein selecting one or more data inputs based on the determined device status score includes:
selecting a data input designated as a dominant factor or a non-resource-intense factor when the device status score is below the device status score threshold; or
selecting a data input designated as a non-dominant factor or a resource-intense factor when the device status score is above the device status score threshold.

4. The method of claim 2, wherein selecting one or more data inputs based on the determined device status includes:
selecting a first number of data inputs when the device status score is below the device status score threshold; or
selecting a second number of data inputs when the device status score is above the device status score threshold.

5. The method of claim 1, wherein determining the device status score for the wireless communication device includes determining at least one of:
a device mode associated with the wireless communication device;
a battery level associated with the wireless communication device;
a processor load associated with the wireless communication device;
a memory load associated with the wireless communication device;
a network connection quality associated with the wireless communication device; or
a list of applications running on the wireless communication device.

6. The method of claim 5, further comprising:
determining a battery level score associated with the battery level;
determining a processor load score associated with the processor load;
determining a memory load score associated with the memory load; or
determining a network connection quality score associated with the network connection quality.

7. The method of claim 1, further comprising:
performing the machine learning process based on receiving a request from an application running on the wireless communication device.

8. The method of claim 1, further comprising:
scheduling the machine learning process at a particular time based on the determined device status score.

9. The method of claim 1, wherein performing the machine learning process using the selected machine learning model includes:
determining that a user of the wireless communication device has selected to send user data to a machine learning system; and
sending the user data to the machine learning system to perform the machine learning process, in response to determining that the user has selected to send the user data to the machine learning system.

10. The method of claim 2, wherein performing the machine learning process using the selected machine learning model and the selected one or more data inputs includes:
obtaining device data associated with the selected one or more data inputs;
mapping the obtained device data to masked values; and
sending the masked values to a machine learning system over a network connection.

11. The method of claim 1, wherein performing the machine learning process using the selected machine learning model includes selecting a plurality of data inputs that include at least two of:
data associated with a touchscreen event,
data associated with an accelerometer,
location data for the wireless communication device,
a cell tower identifier associated with the wireless communication device,
a WiFi access point identifier associated with the wireless communication device, or
a short range wireless device identifier associated with the wireless communication device.

12. The method of claim 11, wherein performing the machine learning process using the selected machine learning model includes:
determining that the machine learning process corresponds to behavioral authentication; and
determining that there has been a change, since a last time that behavioral authentication has been performed, in at least one of:
location data for the wireless communication device,
a cell tower identifier associated with the wireless communication device,
a WiFi access point identifier associated with the wireless communication device, or
a short range wireless device identifier associated with the wireless communication device.

13. A wireless communication device comprising:
a memory configured to store instructions; and
a processor configured to execute the instructions to:
determine a device status score for the wireless communication device, wherein the device status score indicates a current resource capacity of the wireless communication device;
select a machine learning model based on the determined device status score, wherein the machine learning model corresponds to a low accuracy model when the device status score is below a device status score threshold and a high accuracy model when the device status score is above the device status score threshold; and
perform a machine learning process using the selected machine learning model.

14. The wireless communication device of claim 13, wherein the processor is further configured to:
receive a request from an application running on the wireless communication device to perform the machine learning process.

15. The wireless communication device of claim 13, wherein, when determining the device status score for the wireless communication device, the processor is further configured to do at least one of:
determine a battery level score associated with a battery level;
determine a processor load score associated with a processor load;
determine a memory load score associated with a memory load; or
determine a network connection quality score associated with a network connection quality.

16. The wireless communication device of claim 13, wherein the processor is further configured to:
 select one or more data inputs based on the determined device status score; and wherein, when performing the machine learning process using the selected machine learning model, the processor is further configured to use the selected one or more data inputs.

17. The wireless communication device of claim 16, wherein, when selecting one or more data inputs based on the determined device status score, the processor is further configured to:
 select a data input designated as a dominant factor or a non-resource-intense factor when the device status score is below the device status score threshold; or
 select a data input designated as a non-dominant factor or a resource-intense factor when the device status score is above the device status score threshold.

18. The wireless communication device of claim 16, wherein, when selecting one or more data inputs based on the determined device status score, the processor is further configured to:
 select a first number of data inputs when the device status score is below the device status score threshold; or
 select a second number of data inputs when the device status score is above the device status score threshold.

19. The wireless communication device of claim 16, wherein, when performing the machine learning process using the selected machine learning model and the selected one or more data inputs, the processor is further configured to:
 obtain device data associated with the selected one or more data inputs;
 map the obtained device data to masked values; and
 send the masked values to a machine learning system over a network connection.

20. A non-transitory computer-readable memory device storing instructions executable by a processor, the non-transitory computer-readable memory device comprising:
 one or more instructions to determine a device status score for the wireless communication device, wherein the device status score indicates a current resource capacity of the wireless communication device;
 one or more instructions to select a machine learning model based on the determined device status score to match an expected resource use of the selected machine learning model with the current resource capacity of the wireless communication device, wherein the machine learning model corresponds to a first model when the device status score is below a device status score threshold and a second model when the device status score is above the device status score threshold; and
 one or more instructions to perform a machine learning process using the selected machine learning model.

* * * * *